United States Patent
Vook et al.

(10) Patent No.: US 7,558,156 B2
(45) Date of Patent: Jul. 7, 2009

(54) ACOUSTIC LOCATION AND ENHANCEMENT

(75) Inventors: Dieterich Vook, Palo Alto, CA (US); Bruce Hamilton, Palo Alto, CA (US); Jefferson Burch, Palo Alto, CA (US); Andrew Fernandez, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 346 days.

(21) Appl. No.: 11/326,342

(22) Filed: Jan. 6, 2006

(65) Prior Publication Data

US 2007/0159924 A1    Jul. 12, 2007

(51) Int. Cl.
  *G01S 3/80* (2006.01)
  *H04R 3/00* (2006.01)
(52) U.S. Cl. ........................ 367/127; 367/906
(58) Field of Classification Search ................ 367/127, 367/906
  See application file for complete search history.

(56) References Cited

U.S. PATENT DOCUMENTS

| | | | | |
|---|---|---|---|---|
| 5,973,998 A | * | 10/1999 | Showen et al. | 367/906 |
| 6,847,587 B2 | * | 1/2005 | Patterson et al. | 367/127 |
| 7,203,132 B2 | * | 4/2007 | Berger | 367/906 |
| 2004/0100868 A1 | * | 5/2004 | Patterson et al. | 367/127 |
| 2006/0251084 A1 | * | 11/2006 | Elliot | 370/398 |
| 2006/0256660 A1 | * | 11/2006 | Berger | 367/124 |
| 2006/0280033 A1 | * | 12/2006 | Baxter et al. | 367/127 |
| 2007/0159924 A1 | * | 7/2007 | Vook et al. | 367/127 |
| 2007/0230270 A1 | * | 10/2007 | Calhoun | 367/117 |

FOREIGN PATENT DOCUMENTS

| EP | 1806952 A2 | * | 7/2007 |
|---|---|---|---|
| JP | 2007192817 A | * | 8/2007 |

OTHER PUBLICATIONS

"Hierarchical Transmission of Multispeaker Stereo", M.A. Gerzon, Applications of signal processing to audio and acoustics, 1991.
"Coherent Acoustic Array Processing and Localization on Wireless Sensor Networks", J.C. Chen et al, Proceedings of IEEE, vol. 91, No. 8 Aug. 2003, p. 1154-1162.
"The Bat Ultrasonic Location System", Andy Ward et al.

* cited by examiner

*Primary Examiner*—Dan Pihulic

(57) ABSTRACT

A method of locating an acoustic source, the method comprising sampling said acoustic source at a plurality of acoustic receivers having different locations, each acoustic receiver time-stamping a respective received acoustic sample using a system time, each acoustic receiver sending said time-stamped acoustic sample to a central controller, the central controller determining the location of the acoustic source in response to receiving the time-stamped sound source samples from the plurality of receivers.

17 Claims, 17 Drawing Sheets

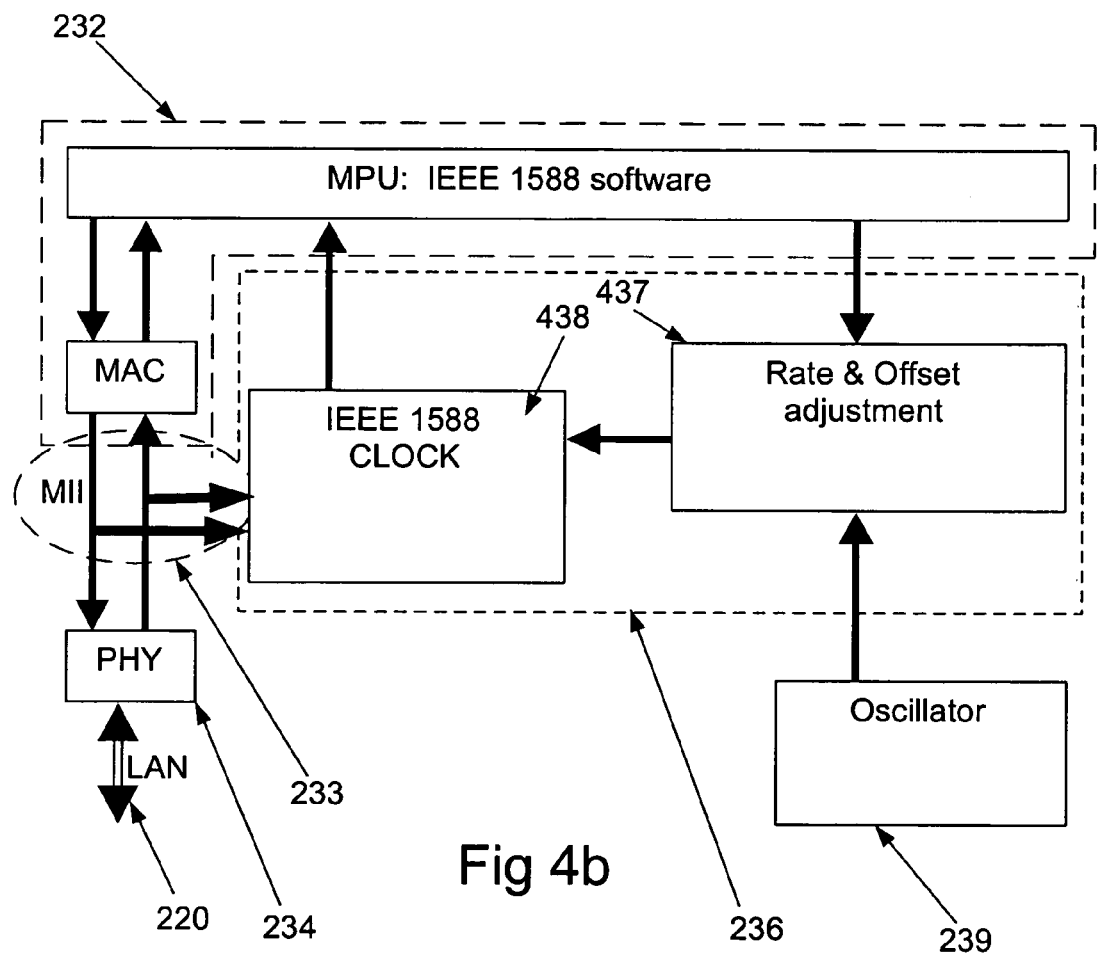

ACOUSTIC LOCATION AND ENHANCEMENT

TECHNICAL FIELD

The present disclosure relates to acoustic or audio source location and acoustic signal enhancement using a number of acoustic receivers having acoustic transducers such as microphones.

BACKGROUND

Systems that locate gunshots based on time of arrival of the gunshot sound at a number of microphones relay the sound to a central controller using open analog lines, for example telephone lines. The central controller can then locate the source of the gunshot sound relative to the microphone locations using the relative arrival times at the various microphones. The microphones are typically located on telephone poles, and these systems can locate a gunshot to a region the size of a city block. Greater accuracy can be obtained by using more microphone, computing and communication line resources. However these systems do not scale well as they require open analog lines having well characterized delays in order to accurately determine the location of an acoustic source.

In other acoustic location systems, acoustic signals are sampled and stored at a number of microphones. Samples within a given time range are requested by a central controller in order to calculate the acoustic source location using time of arrival information from each of the requested microphones. The time ranges requested for each microphone are offset according to their location and the relative timing differences between their respective local clocks. This system however is processor and memory intensive.

In yet other acoustic location systems, by knowing in advance the times at which acoustic signals will be emitted, acoustic sensors can determine their respective ranges to the source of the acoustic signal (knowing the speed of sound) and then use triangulation to determine the position of the acoustic source.

Enhancement of acoustic signals received from an acoustic source having a determined location can be achieved using directional microphones. Other solutions attempt to remove noise from the received signal.

SUMMARY

In general terms in one aspect, there is provided an array of acoustic or audio receivers which may comprise audio transducers such as microphones or sound sensors coupled to a central controller or processor by a communications path such as a network. The acoustic receivers are arranged to sample acoustic signals from an acoustic or audio source such as a gunshot or a speaker in an auditorium, and to time-stamp those samples at the respective acoustic receiver using a common or system time. The system time is a common time to which the acoustic receivers and the central controller are synchronized, and in an embodiment is implemented by respective local clocks synchronized using the Precision Time Protocol (PTP) as defined in IEEE Standard 1588-2002, "IEEE Standard for a Precision Clock Synchronization Protocol for Networked Measurement and Control Systems", IEEE, New York, 2002; hereafter referred to as PTP. The time stamped acoustic samples from each acoustic receiver are then sent over the communications path to the central controller which may or may not be integrated with one of the acoustic receivers. In an embodiment the communications path comprises a digital communications path having a non characterized delay such as an Ethernet Local Area Network or other path having a non-characterized delay. A non characterized delay is a signal propagation delay which is unknown. The central controller, knowing the locations of the acoustic receivers, calculates the location of the acoustic source using the relative time differences between reception (the time stamps) of common acoustic features or events at each of the acoustic receivers.

Alternative embodiments may utilize different system time synchronization methods, and in some low accuracy applications even a low accuracy synchronization method such as Network Time Protocol (NTP) as commonly used on the Internet may be employed.

Communications paths having characterized delay may be used between the acoustic receivers and the central controller, for example analog coaxial cables of known length. Similarly various communications paths having non-characterized delays can alternatively be used including any packet switched digital network such as the Internet, and Wireless LANs such as provided by the IEEE802.11 protocol standards.

The sampled acoustic signals may be digitized, or recorded in an analog format, before being time-stamped. In an embodiment, the sampling is only carried out in response to detecting a predetermined acoustic pattern or event such as a gunshot. Alternatively however the acoustic receivers may continuously sample acoustic signals. Similarly, time-stamped acoustic samples may be stored at respective acoustic receivers until requested by the central controller, or alternatively the time-stamped samples may be automatically sent to the central controller.

The central controller may utilize various methods of calculating the location of the acoustic source using time-stamped samples from a number of acoustic receivers. In an embodiment, a system of hyperbolas are used to determine the distances from each acoustic receiver to the acoustic source using the time differences of receipt of common acoustic events (e.g. the start of a gun shot) at each respective acoustic receiver. A system of hyperbolic equations is solvable to determine the range from each acoustic receiver to the acoustic source. A known application of this system of hyperbolas to determine distances is used in the Long Range Navigation (LORAN) system as described at en.wikipedia.org/wiki/LORAN. Triangulation using a system of intersecting range circles can then be used to locate the acoustic source with respect to the acoustic receivers. Knowing the location of the acoustic receivers then enables the position of the acoustic source to be fixed. Various other methods of calculating location of a sound source given time of arrival differences at known locations will also be available to those skilled in the art.

Once the location of the acoustic source is determined, the received acoustic samples can be coherently combined, that is time aligned and added, in order to produce an enhanced acoustic signal, for example to amplify and/or reduce the noise of the acoustic signal; for example the original gunshot.

Similarly, the central controller can instruct the acoustic receivers to sample the acoustic source at respective acoustic receiver times, dependent on their determined distance from the acoustic source. Then the so sampled acoustic signals can be sent to the central controller already aligned for coherent combining in order to produce an enhanced acoustic signal. In other words corresponding samples at each acoustic receiver capture the same acoustic feature but at different locations. The samples are then aligned in the sense that their respective sampling times are arranged to capture the same acoustic features. This might be applied for example in a seminar setting where a speaker from the audience can be located using an array of microphones, and then the microphones timed to sample the speaker at appropriate intervals in order to obtain an enhanced reception of the speaker's voice.

In another aspect there is provided a method of locating an acoustic source, the method comprising: sampling said acoustic source at a plurality of acoustic receivers; each acoustic receiver time-stamping a respective received acoustic sample using a system time; each acoustic receiver sending said time-stamped acoustic sample to a central controller; the central controller determining the location of the acoustic source in response to receiving the time-stamped sound source samples from the plurality of receivers.

In another aspect there is provided a system for locating an acoustic source, the system comprising: a plurality of acoustic receivers arranged to sample the acoustic source; each acoustic receiver having a clock and a processor arranged to time-stamp the acoustic samples, the local clocks being synchronized to a system time; each acoustic receiver having a communications interface arranged to send said time-stamped samples to a central controller; the central controller arranged to receive the time-stamped samples and to determine the location of the acoustic source using said time-stamped samples from the plurality of receivers.

In another aspect there is provided an acoustic receiver comprising: an acoustic transducer for transducing acoustic signals received from an acoustic source; a local clock arranged to synchronize to an external system time; a communications interface arranged to interface with a communications path; and a processor arranged to sample the transduced received acoustic signals from the acoustic source, and to transmit said samples onto said communications path.

In another aspect there is provided an acoustic receiver comprising: an acoustic transducer for transducing acoustic signals received from an acoustic source; a local clock arranged to synchronize to an external system time; a communications interface arranged to interface with a communications path; and a processor arranged to sample the transduced received acoustic signals from the acoustic source, to time-stamp said samples using the local clock, and to transmit said time-stamped samples onto said communications path.

Transmitting or sending the time-stamped samples may be achieved in an embodiment by sending each sample together with a respective time stamp to the central controller. Alternatively, sending of the time stamped samples may be implemented in another embodiment by sending a first time stamped sample in a sequence of time stamped samples together with its respective time stamp and a time stamp spacing, then sending only the time stamped samples in the rest of the sequence but without their respective time stamps. By knowing the first time stamp and the time stamp or sample time spacing, the central controller receiving the sequence of time stamped samples can determine their proper sample time from the first samples time stamp, the sample time spacing, and their received order in the sequence of samples. This is despite the delay over the communications path being non characterized, and uses the assumption that the sequence in which the time stamped samples were transmitted or sent will be the same as the sequence in which they are received by the central controller. This assumption is valid in a LAN or many other types of digital network based communications paths, though may not be able to be applied in larger networks such as the Internet for example where packets can arrive out of sequence.

In another aspect there is provided a method of sampling an acoustic source, the method comprising: transducing acoustic signals received from the acoustic source; sampling the transduced acoustic signals using an external system time; time-stamping the sampled acoustic signals using the system time; transmitting the time-stamped sampled acoustic signals onto a communications path.

In another aspect there is provided a central controller comprising a communications interface arranged to receive time-stamped acoustic samples from a number of acoustic receivers over a communications path; and a processor arranged to determine the location of the acoustic source using the time-stamped acoustic samples.

In another aspect there is provided a method of determining the location of an acoustic source, the method comprising: receiving over a communications path time-stamped samples of the acoustic source from a number of acoustic receivers; determining the location of the acoustic source based on the received time-stamped acoustic samples.

The location can be determined using known positions of the acoustic receivers and the relative receipt times (as indicated by their respective time-stamps) of common acoustic features or patterns.

In an embodiment the central controller identifies common acoustic features in the received time-stamped samples from a number of the acoustic receivers, and determines the timing offsets or differences in reception times of the identified common acoustic features using the respective time-stamps.

In an embodiment, the communications path is has a non characterized delay such as a LAN for example; and the communications interface is adapted to interface with this communications path having a non characterized delay. Alternatively the communications path delay may be characterized, such as an analog coaxial path of known length for example.

In an embodiment, the clock at each acoustic receiver is synchronized to the external or system time using the Precision Time Protocol. This can be implemented using PTP hardware incorporated in the receiver, and which recovers (copies) and time-stamps all PTP synchronization packets traversing the PHY and MAC layers interface at the associated acoustic receiver. Alternative arrangements are contemplated for different embodiments, for example hardware time-stamping synchronization packets from a different time synchronization protocol, or even "snooping" synchronization packets at a different interface, for example directly from the PHY or MAC layers, or even directly from the communications path. Similarly, different synchronization protocols could be used with different synchronization messages.

Once the location of the acoustic source is determined, the received acoustic samples can be coherently combined, that is common acoustic features are aligned and added, in order to produce an enhanced acoustic signal, for example to amplify and/or reduce the noise of the acoustic signal; for example the original gunshot.

In general terms in another aspect there is provided an array of acoustic receivers which may comprise acoustic transducers such as microphones or acoustic sensors coupled to a central controller by a communications path such as a network. The acoustic receivers are arranged to sample acoustic signals from an acoustic or audio source such as a gunshot or a speaker in an auditorium at respective acoustic receiver sampling times using a system time. The system time is a common time used by all the acoustic receivers, and in an embodiment is implemented by respective local clocks synchronized using the PTP time synchronization protocol. The respective acoustic receiver sampling times are determined and sent by the central controller to each respective acoustic receiver, and are dependent on the location of the acoustic source relative to each respective acoustic receiver. For example the greater the distance from the acoustic source to an acoustic receiver, the later the respective acoustic receiver sampling time for that acoustic receiver compared with a closer acoustic receiver for example. The suitably timed acoustic samples are then sent over the communications path to the central controller which may or may not be integrated with one of the acoustic receivers. In an embodiment the communications path comprises a digital communications network having a non characterized delay such as an Ethernet Local Area Network or other non-characterized delay path. The central controller then coherently adds or otherwise processes the sampled acoustic signals, in order to produce an enhanced acoustic signal representing the acoustic source; for example an amplified and/or lower noise acoustic signal.

The acoustic samples sent from the acoustic receivers to the central controller may or may not be time-stamped with the synchronized local time. In some embodiments time stamping is not required as the acoustic samples are captured at respective acoustic receiver sampling times determined by the central controller, and these samples may be associated with this sampling time by a mechanism other than time-stamping. For example each sample may be sent down a characterized delay communications path so that the central controller can determine its sampling time and the acoustic receiver that sampled it. Alternatively each set of samples (one form each acoustic receiver) may be suitably labeled. However in other embodiments time-stamping may be used so that only time-stamped samples from each acoustic receiver that correspond to that acoustic receiver's respective sampling time are combined by the central controller. The acoustic samples may or may not be digitally sampled.

Alternative embodiments may utilize different system time synchronization methods, for example in some low accuracy applications a low synchronization accuracy method such as Network Time Protocol (NTP) as commonly used on the Internet may be used. Characterized delay communications paths may be used between the acoustic receivers and the central controller, for example analog coaxial cables. Similarly various non-characterized delay communications paths can alternatively be used including any packet switched digital network such as the Internet, and Wireless LANs such as provided by the IEEE802.11 protocol standards.

The location of the acoustic source may be determined by earlier outlined aspects of this disclosure, however alternative methods of location may alternatively be used. For example the acoustic source location may correspond to a point on a floor plan of an auditorium for example which can be readily identified manually by an observer, or automatically by a suitable system. In another example the location of a speaker standing at a podium can be determined where the location of the podium is known from building drawings and a height is assumed for the speaker. In another case (e.g. making a movie), tracking a sound source which is being moved through a known trajectory with a gantry or robot, the location of the sound source can be determined from the trajectory and the time.

In another aspect there is provided a method of receiving samples from an acoustic source, the method comprising: sampling said acoustic source at a plurality of acoustic receivers having different locations and at respective acoustic receiver sampling times, said acoustic receivers having been synchronized to a system time; each acoustic receiver sending said acoustic samples to a central controller; the central controller processing the acoustic samples received from the plurality of acoustic receivers.

In another aspect there is provided a system, of receiving samples from an acoustic source, the system comprising: a plurality of acoustic receivers for sampling said acoustic source at different locations and at respective acoustic receiver sampling times; each acoustic receiver synchronized to a system time and arranged to send said acoustic samples to a central controller; the central controller arranged to process the acoustic samples received from the plurality of acoustic receivers.

The respective acoustic receiver sampling times may be dependent on the distance from the acoustic source and hence the expected times of arrival at each receiver of common acoustic features or patterns such that these are sampled from different locations. These samples from the different acoustic sources then record common acoustic events and can be combined by the central controller.

In another aspect there is provided a central controller comprising: a processor arranged to determine respective acoustic receiver sampling times for each of a number of acoustic receivers with respect to a system time; a communications interface arranged to receive acoustic samples from the acoustic receivers and corresponding to the sampling times over a communications path in response to instructions to the acoustic receivers to sample at their respective receiver sampling times; the processor further arranged to combine the received samples.

In another aspect there is provided a central controller comprising: a local clock synchronized to a system time; a processor arranged to determine respective acoustic receiver sampling times with respect to the system time for each of a number of acoustic receivers; a communications interface arranged to receive acoustic samples from the acoustic receivers; the processor further arranged to combine the received samples corresponding to the determined respective acoustic receiver sampling times from the respective acoustic receivers.

In an embodiment time stamped acoustic samples may be received from the acoustic receivers, and the central controller is arranged to combine only those corresponding to respective acoustic receiver, sampling times.

In another aspect there is provided a method of enhancing the acoustic signals from an acoustic source, the method comprising: determining acoustic receiver sampling times for each of a number of acoustic receivers with respect to a system time; instructing the acoustic receivers over a communications path to sample at their respective receiver sampling times; receiving the corresponding acoustic samples from the acoustic receivers over the communications path; combining the received acoustic samples.

In another aspect there is provided a method of enhancing the acoustic signals from an acoustic source, the method comprising: determining acoustic receiver sampling times with respect to a system time for each of a number of acoustic receivers; receiving acoustic samples from the acoustic receivers over the communications path; combining the received acoustic samples which correspond to the determined acoustic receiver sampling times.

The respective acoustic receiver sampling times may be dependent on the distance between each respective acoustic receiver and the acoustic source. The controller may process the received samples, for example to enhance the acoustic signal by coherently combining the received samples.

In another aspect there is provided an acoustic receiver comprising: an acoustic transducer for transducing acoustic signals received from an acoustic source; a local clock synchronized to an external system time; a communications interface arranged to interface with a communications path; and a processor arranged to receive a respective acoustic receiver sampling time and to sample the received acoustic signals from the acoustic source at said respective acoustic receiver sampling time, and to transmit said samples onto said communications path.

In another aspect there is provided a method of sampling an acoustic source, the method comprising: synchronizing to a system time; receiving a respective acoustic receiver sampling time; transducing acoustic signals received from the acoustic source; sampling the transduced acoustic signals at said respective acoustic receiver sampling time; transmitting the sampled acoustic signals onto a communications path.

In an embodiment the respective acoustic receiver sample times may correspond to respective time offsets at each acoustic receiver such that the acoustic source is sampled periodically by each acoustic receiver, but at a respective time offset dependent on its distance from the acoustic source. Thus a set or group of samples may be generated for each sampling period, one from each acoustic receiver. Samples from one set may be distinguished from samples from another set by receipt times at the controller where a characterized delay communications path is employed, or by suitable identifiers or labels, or by time-stamps applied at the acoustic receiver and which can be sued by the central controller to identify all samples within a particular time range.

In general terms in another aspect there is provided a method of locating acoustic receivers such as microphones or acoustic sensors in an array of such receivers. This can be achieved using a calculation and knowledge of the position of at least two of the acoustic receivers, the position and timing of an acoustic source, and the speed of sound. From this information, the relative and hence actual locations of each of the other acoustic receivers can be determined. The acoustic source can be from a sound source associated with one of the acoustic receivers, for example a buzzer or speaker, which emits a sound at a predetermined time. Alternatively an independent acoustic source can be used. This method may be used to calibrate the above outlined location and enhancement systems in order to accurately locate the array of acoustic receivers.

The acoustic receivers of the array are coupled together using a communications path. In an embodiment the communications path comprises a non characterized delay digital communications path such as an Ethernet Local Area Network or other non-characterized delay path. However a characterized delay path may alternatively be used.

Each of the acoustic receivers (and if used the central controller) are synchronized to a system time. In an embodiment this is implemented by respective local clocks synchronized using the IEEE 1588 time synchronization protocol.

In one aspect there is provided a method of locating an unknown location acoustic receiver, the method comprising: determining the arrival time of an acoustic signal at said unknown location acoustic receiver and two known location acoustic receivers, the acoustic signals having been transmitted at a known time and from a known location acoustic source; determining the location of the unknown location acoustic receiver dependent on the arrival time differences between the acoustic receivers.

This method may be repeated to fix the position of a number of unknown location acoustic receivers.

In an embodiment, determining the location of the unknown location receiver comprises determining acoustic signal time of arrival differences between the acoustic receivers where the received acoustic signals correspond to common acoustic events; calculating the relative distance from the acoustic source to each acoustic receiver based on said time of arrival differences; determining the location of the unknown location acoustic receiver using said relative distances and the locations of the known location acoustic receivers.

In an embodiment, the acoustic source may be one of the known location acoustic receivers, which incorporates a sounder such as a speaker.

In another aspect there is provided an acoustic receiver comprising: an acoustic transducer for transducing acoustic signals received from an acoustic source; a local clock arranged to synchronize to an external system time; a communications interface arranged to interface with a communications path; a processor arranged to sample the transduced received acoustic signals from the acoustic source, and to transmit said samples onto said communications path; an acoustic sounder.

In another aspect there is provided an acoustic receiver comprising: an acoustic transducer for transducing acoustic signals received from an acoustic source; a local clock arranged to synchronize to an external system time; a communications interface arranged to interface with a communications path; a processor arranged to sample the transduced received acoustic signals from the acoustic source, to time-stamp said samples using the local clock, and to transmit said time-stamped samples onto said communications path; and an acoustic sounder.

In another aspect there is provided an acoustic receiver comprising: an acoustic transducer for transducing acoustic signals received from an acoustic source; a local clock synchronized to an external system time; a communications interface arranged to interface with a communications path; a processor arranged to receive a respective acoustic receiver sampling time and to sample the received acoustic signals from the acoustic source at said respective acoustic receiver sampling time, and to transmit said samples onto said communications path; and an acoustic sounder.

Each of the outlined methods may be implemented in software or some other means.

BRIEF DESCRIPTION OF THE DRAWINGS

Embodiments will now be described with reference to the following drawings, by way of example only and without intending to be limiting, in which:

FIG. 4*b* illustrates the IEEE1588 hardware and software interface at an acoustic receiver or central controller;

DETAILED DESCRIPTION

Figure 1:
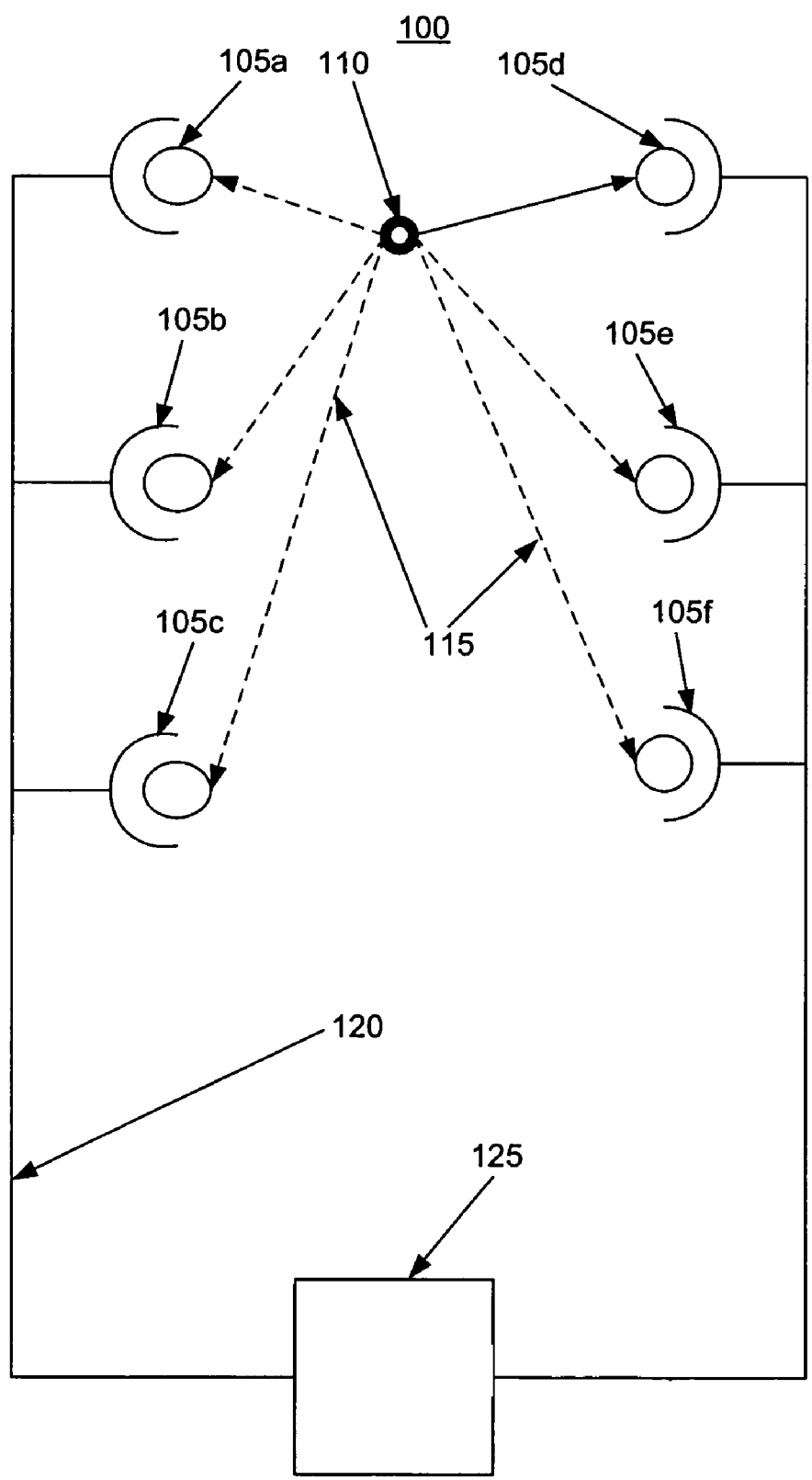
FIG. 1 shows a system of acoustic receivers according to an embodiment.

FIG. 1 illustrates a system for determining the location of an acoustic or sound source according to an embodiment. The system 100 comprises an array of acoustic receivers 105a-105f typically having microphones or other acoustic transducers and which are coupled to a central controller 125 by a network 120. The central controller may be integrated with one of the acoustic receivers 105, or it may be a separate entity as shown. The locations of the microphones or acoustic receivers 105 are known and typically they may be arranged to "surround" an area containing an acoustic source of unknown location. However various other arrangements or location layouts of the acoustic receivers or microphones could be used including for example a planar array or a distributed array in which the microphones are distributed throughout an area of interest rather than just being located at its periphery for example.

The location of the acoustic source 110 is not initially known, and the relative "time of flight" of an acoustic emission or sound from the acoustic source 110 to each acoustic receiver 105 is illustrated schematically by lines 115. Therefore the same acoustic emission will arrive at the different acoustic receivers at different times. Because the time of the acoustic emission from the acoustic source is not assumed, at least three acoustic receivers 105 are required in order to calculate the location or position of the acoustic source using these different arrival times as described in more detail below.

The network 120 may be a local area network (LAN), wireless LAN, or even the Internet for example, and comprises a non characterized delay communications path. The non characterized communications path has a delay which is not fixed or reliably predictable. Typically the non characterized delay communications path is implemented using a digital packet switched connection. Using a non characterized delay communications path means that the system does not rely on the delay of the communications path in order to estimate the location of the acoustic source, and therefore cheaper communications paths can be used. For example a single cable loop may be used for a network whereas a dedicated high quality cable of known length may be required for a characterized delay communications path. Alternatively however a characterized delay communications path such as an analog coaxial cable or telephone line may be used in some embodiments.

Figure 2:
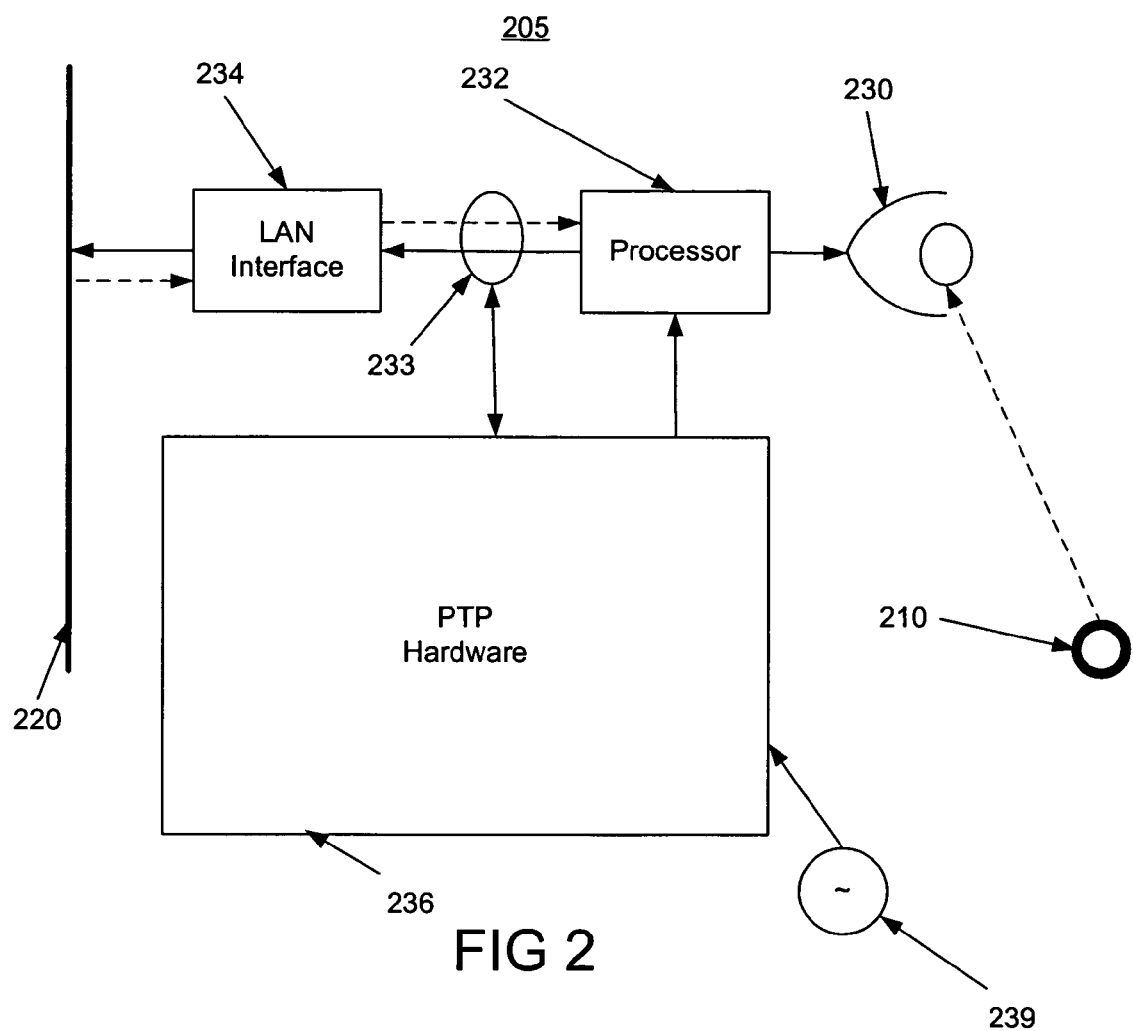
FIG. 2 illustrates an acoustic receiver according to an embodiment.

A schematic diagram of an acoustic receiver suitable for use in the system of FIG. 1 is shown in FIG. 2. The acoustic receiver 205 comprises an acoustic transducer 230 such as a microphone, a processor 232, a communications path interface 234 such as an Ethernet LAN interface, a system time synchronizing element 236 such as implementation of PTP hardware, and a local oscillator 239. The PTP hardware 236 includes a local clock which is synchronized to an external or system time, provided by a master clock which may be located in the central controller 125 or elsewhere. The master clock may alternatively be located in one of the acoustic receivers.

The hardware based PTP synchronization equipment 236 can be employed in order to synchronize the various local clocks of the acoustic receivers and central controller to within microseconds of each other. However software implemented PTP synchronization may be utilized in embodiments requiring less location accuracy. An overview of the operation of the PTP method and hardware is given below with respect to FIGS. 4a and 4b, however the details of the system will be readily available to the skilled person. In other embodiments alternative synchronization mechanisms can be used, such as Network Time Protocol (NTP). The type of synchronization used may depend on the acoustic source location accuracy required or cost for example.

Figure 3:
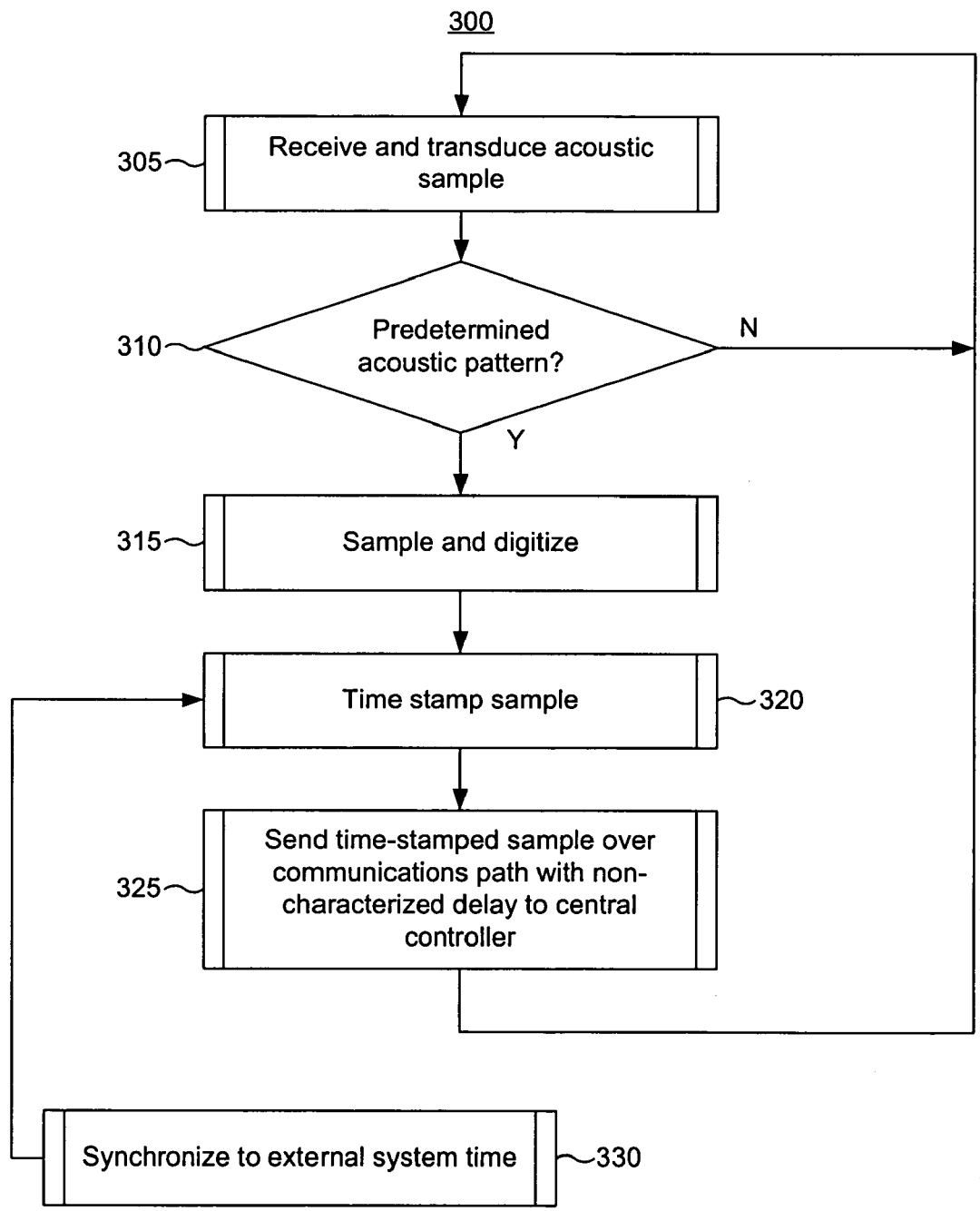
FIG. 3 illustrates a method of sampling an acoustic source at an acoustic receiver according to an embodiment.

The communications path interface 234 is coupled to a non characterized delay communications path 220 such as an Ethernet LAN. The time synchronizing interface 236 is also coupled to the non characterized delay communications path 220 although a separate synchronization route could be used. Where PTP synchronization is used, coupling to the communications path can be via the communications path interface 234 as described in more detail with respect to FIG. 4b A method of operation of the acoustic receiver of FIG. 2 is described with reference to FIG. 3. The method (300) receives acoustic signals or sounds from the acoustic source (305), and these are transduced by the acoustic transducer 230. Optionally, the acoustic receiver 205 may determine whether the received signals correspond to a predetermined acoustic pattern or acoustic event (310), such as a gunshot, footfalls, or a human voice. These may be implemented by the processor 232 by for example comparing a frame of received acoustic signals with acoustic signal patterns stored on local memory (not shown). If no such pattern is detected (310N), then the method (300) continues to monitor incoming acoustic signals. If a predetermined pattern is detected (310Y) or if this option is not used, then the received and transduced acoustic signals are sampled and digitized (315). This operation will be typically carried out by the general purpose processor 232.

The acoustic sample(s) is then time-stamped (320) by the processor 232 using the system time to which the local clock which is incorporated in the PTP hardware 236 is synchronized. This is indicated in the figure by a parallel synchronization process (330). As noted above, in this embodiment the local clock is synchronized to an external system time by the PTP interface 236. The time-stamped sample is then transmitted over the non characterized delay communications path (325) to the central controller 125. Each time-stamped sample may be sent as a packet having a number corresponding to the sample value and a number corresponding to the time-stamp for example, although various mechanisms for transmitting time-stamped samples will be available to those skilled in the art. For example in some embodiments a sequence of time stamped samples with regular sampling periods may be sent with only the first sample in the sequence including its time stamp number or value together with a sampling time spacing. The receiver can then recover the time stamps for the samples in the sequence which follows the first sample using the first sample's time stamp value and the sample time spacing. Either way, the time-stamped samples may be continuously sent, or alternatively they may be stored locally on local memory and sent on request, for example from the central controller 125.

Figure 4A:
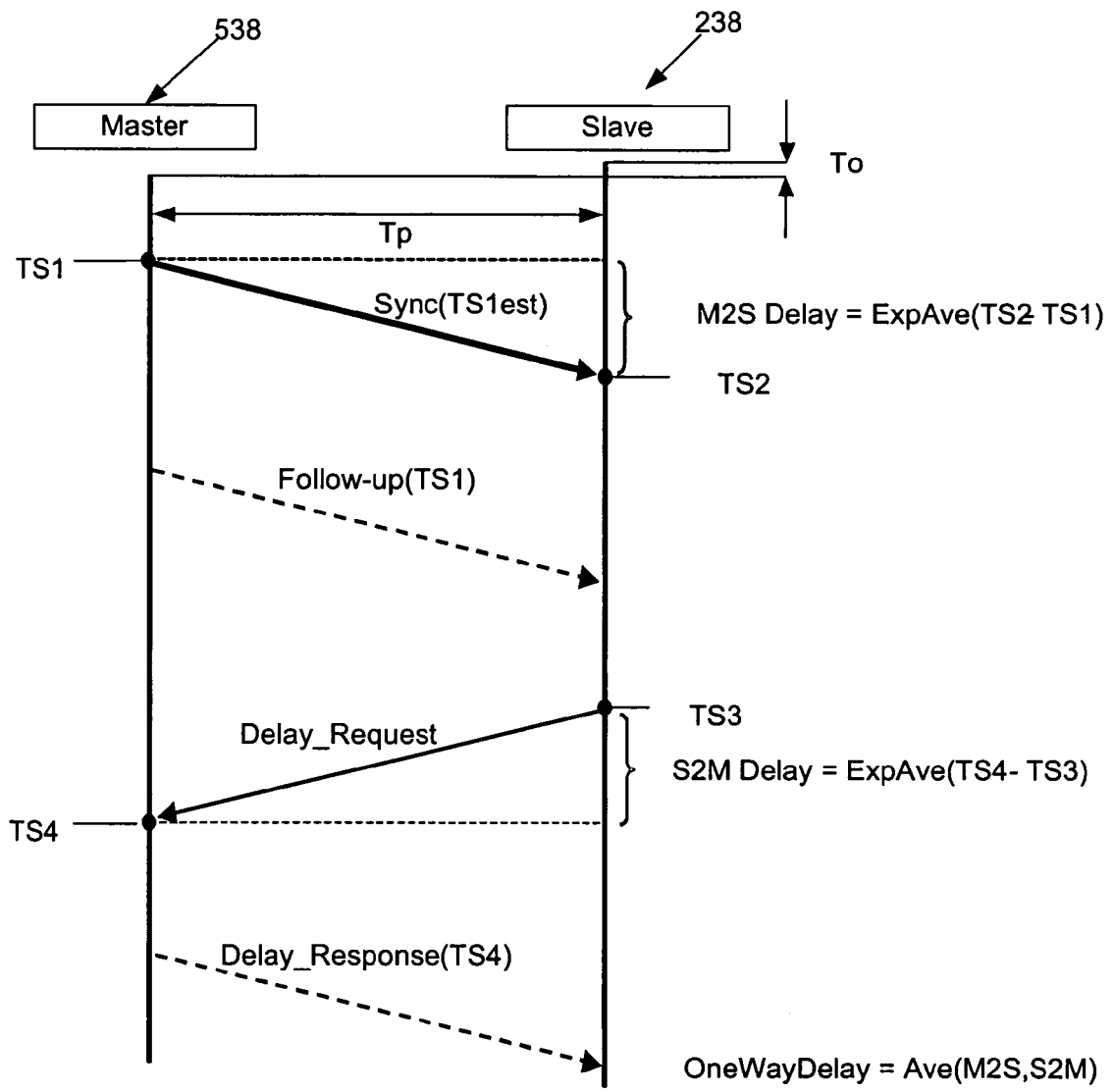
FIG. 4*a* illustrates a method of synchronizing clocks according to the IEEE1588 protocol.

FIG. 4a illustrates operation of a version of the PTP (Precision Clock Synchronization Protocol for Network Measurement and Control Systems) time synchronization protocol which is typically employed in measurement sensor and control networks having high-accuracy timing requirements but without requiring deterministic latency in the communications technology—in other words a non characterized delay communications path or communications path having a non characterized delay can be employed. Using appropriate hardware, timing accuracies in the sub-microsecond range can be achieved over a local area network. In the application of the present embodiment, it should be noted that over such a time period sound will travel less than 1 mm, making accurate localization of an acoustic source possible.

The PTP system utilizes a master clock 538 and a number of slave clocks 238, in this embodiment coupled together using the same communications path used by the acoustic receivers, although separate paths could be used. In other embodiments the master clock may be separate from the central controller and acoustic receivers, or may be located in one of the acoustic receivers. In FIG. 4a there is a timing offset (To) between the master and slave clocks, as well as a propagation delay (Tp) in each direction across the communications path for example a LAN. The master clock transmits a sync message which includes its estimated time of transmission (estTS1) from the master clock. A second follow-up message may be sent at a later time depending on the implementation details of the PTP system and which includes the exact transmission time (TS1) of the first sync message, as time-stamped by the PTP hardware (536 in FIG. 5) associated with the master clock. The estimated and actual times of transmission could be different because for example of collisions and/or contention delays on the Ethernet medium used and in particular the variation in delay in the software stack.

PTP hardware 236 in the receiver associated with the slave clock determines the arrival time (TS2) of the sync message using the local or slave clock of the acoustic receiver. Once the follow-up message is also received, the M2S delay can be determined as ExpAve(TS2-TS1), which includes both the time offset (To) and the propagation delay (Tp). The slave clock then issues a delay_request message in the reverse direction to the master clock. The time of transmission of the delay_request message (TS3) is noted by the receiver PTP hardware. The delay_request message is received by the master clock PTP hardware which notes the time of arrival (TS4). A delay_response message is sent from the master clock to the slave clock with the time of arrival (TS4) of the delay_request message. Once this is received by the slave clock, it determines the S2M delay as ExpAve(TS4-TS3), which also includes both the time offset (To) and the propagation delay (Tp) The slave clock now has four timestamps which are used to solve simultaneously for the offset (To) between the clocks and the message propagation time. Knowing the offset (To) of its clock from the master's, the slave can speed up or slow down as appropriate.

By performing these steps at regular intervals, the slave clock tracks the master's time. Variations in these steps are known to those skilled in the art, for example in some embodiments of PTP the slave does not send a delay_request message after receiving the sync message—it sends it less often, and at randomly-chosen times.

FIG. 4b illustrates the interaction of PTP hardware and software with the receiver of FIG. 2. The PTP hardware 236 includes a PTP clock 438 and a rate and offset adjustment functional block 437, typically implemented as a servo. The PTP hardware 236 snoops (listens in to) packets, passing between the Ethernet LAN PHY (physical) layer 234, typically a 100 Base_T encoder, and the corresponding MAC (media access control) layer which is typically implemented in the processor 232. The interface 233 between the PHY and MAC layers is typically a defined interface, for example MII (media independent interface) or GMII, (Gigabit MII). The PTP hardware 236 recognizes PTP packets, and time-stamps them using the local PTP clock 438. This avoids the software jitter associated with higher levels of the software stack (ie MAC and above). Thus the times of arrival/departure of the above described synchronization messages are accurately determined. This timing information is routed to the microprocessor to interact with the PTP software implemented there, and used to steer the clock using a servo 437.

In alternative embodiments, different time synchronizing techniques can be used, for example using hardware time-stamping but a different sequence of synchronization messages from that described with respect to FIG. 4a. In another alternative, the PTP hardware may interface with the communications protocol stack at a different level, for example at the MAC layer or possibly even higher. In some embodiments, corresponding hardware may snoop directly on the LAN or other communications line, additionally recognizing packets addressed to/from its associated receiver for example. Other time synchronization protocols that can be used in other embodiments include Network Time Protocol (NTP).

Figure 5:
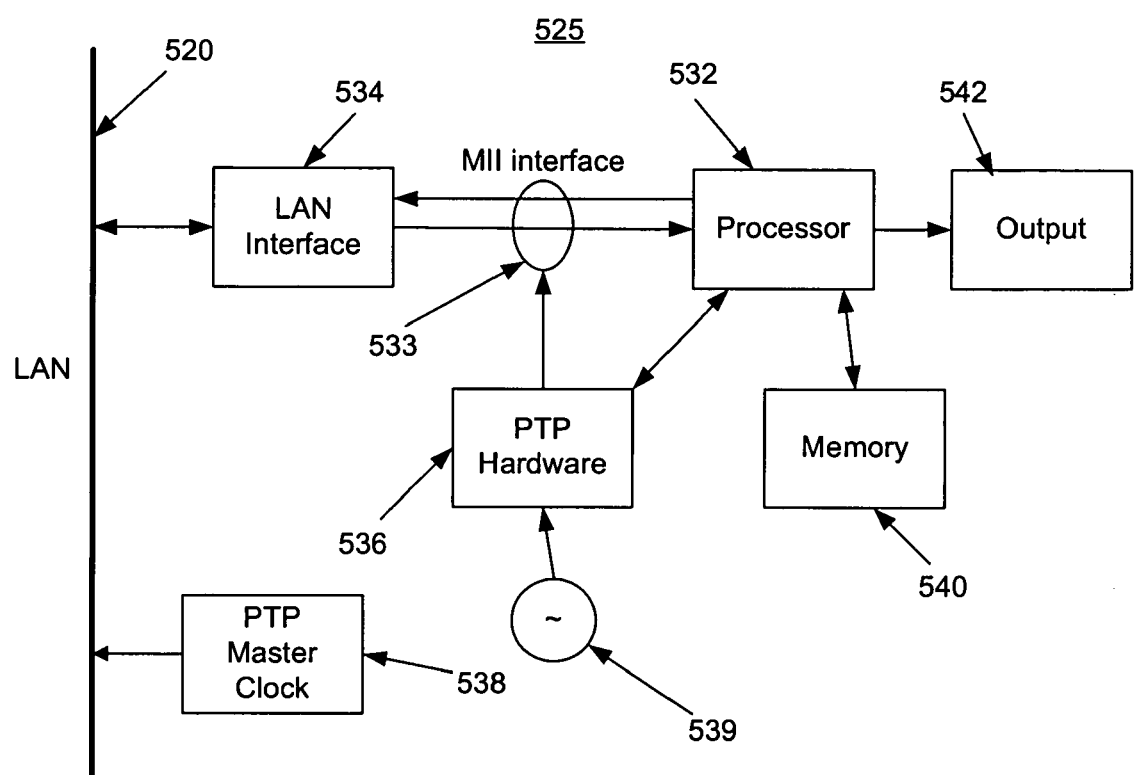
FIG. 5 illustrates a central processor according to an embodiment.

A schematic diagram of a central controller suitable for use in the system of FIG. 1 is shown in FIG. 5. The central controller 525 comprises a communications path interface 534 such as an Ethernet LAN interface, a time synchronizing interface 236 such as a PTP time synchronizing chip, a processor 532 and local memory 540, and an output 542 such as a graphical user interface (GUI) for displaying the location of the acoustic source, or for interfacing with other equipment for using this information. In another embodiment described below, once the location of the acoustic source is determined, the acoustic receivers can be used to sample this at times dependent on their relative location to the acoustic source and hence provide an enhanced acoustic signal.

A master clock 538 for the system of acoustic receivers is also shown and for simplicity of explanation this is shown as implemented as part of the central controller, however it may be separate from other parts of the system, or located within one of the acoustic receivers. Similarly for simplicity of explanation the central controller is shown with time synchronizing functionality (536), however this is not necessary for the present embodiment as it is the time offsets or differences in acoustic signal arrival times at the acoustic receivers which are used to locate the acoustic source.

The communications path interface 534 is coupled to a communications path having a non characterized delay 520 such as an Ethernet LAN. The time synchronizing interface 536 is analogous to the PTP hardware 236 described in FIG. 2 and 4b. The local clocks 438 of the acoustic receivers 205 and the controller 525 are synchronized to the PTP master clock 538 using the PTP protocol as described with respect to FIG. 4a.

A method of operation of the central controller of FIG. 5 is described with reference to FIG. 6. The method (600) receives time-stamped acoustic samples from a number of acoustic receivers (605). These are received via the communications path interface 534 from the communications path or network 520. As discussed above, this is typically a non characterized delay network such as an Ethernet LAN. The method (600) determines whether samples from enough acoustic receivers have been received (610). As discussed above, a minimum of samples from three different known locations are required when the location and timing of the acoustic source are unknown.

The method (600) then determines the relative times of arrival or time offsets of corresponding acoustic signals between the acoustic source and each of the acoustic receivers according to their respective time-stamped acoustic samples (615). The time of flight between the acoustic source and an acoustic receiver is the time for the sound to travel (at the speed of sound) from the source to the receiver, and is indicated by the length of the lines 115 in FIG. 1. Because the location of the acoustic source and the time at which the sound was emitted are unknown, the actual times of flight to the various acoustic receivers are also unknown. However the differences in the times of arrival or time offsets can be determined and used to calculate the range or distance between each acoustic receiver and the acoustic source.

Figure 7A:
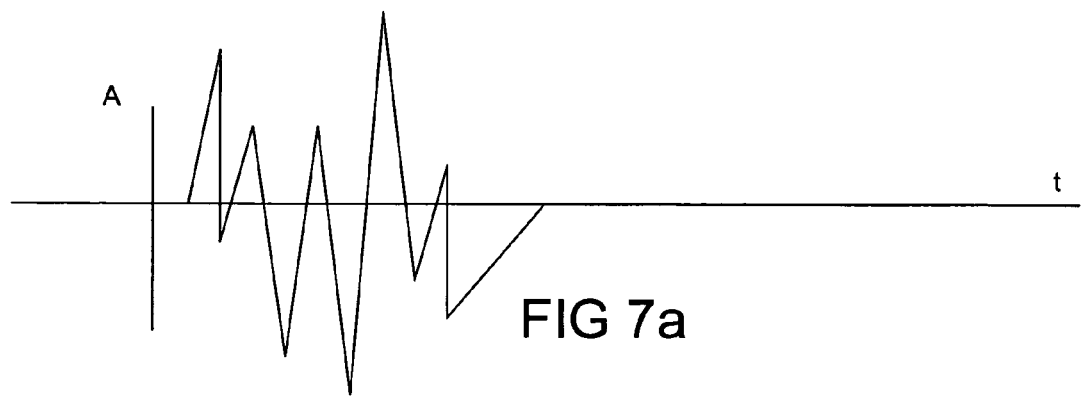
FIGS. 7*a*-7*c* illustrate an acoustic samples received from three of the acoustic receivers of FIG. 1.
Figure 7B:
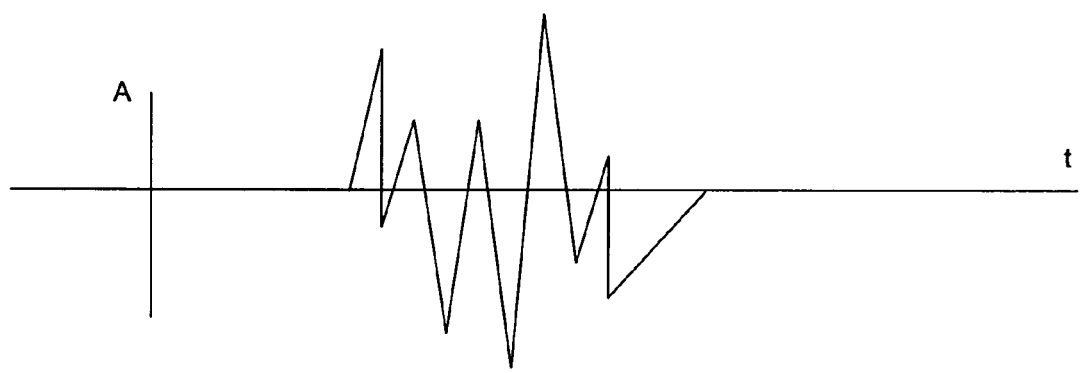
Figure 7C:
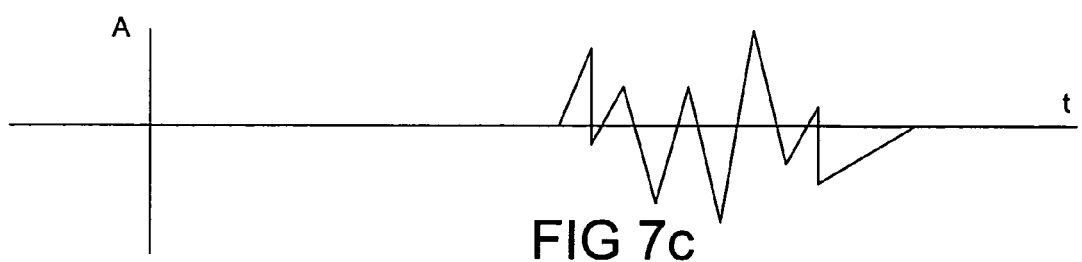

FIGS. 7a-7c illustrate the time of arrival differences or timing offsets of a sound or acoustic pattern received by three different acoustic receivers. It can be seen that the acoustic pattern is received later at the second (FIG. 7b) and third (FIG. 7c) acoustic receivers than the first acoustic receiver (FIG. 7a). Thus the first acoustic receiver must be closer to the source than the other two. By determining the relative timing between reception of these acoustic patterns at respective acoustic receivers (615), and knowing the actual locations (or at least the relative locations) of the acoustic receivers, this information can be used to determine the distance between each of these acoustic receivers and the acoustic source.

Figure 8A:
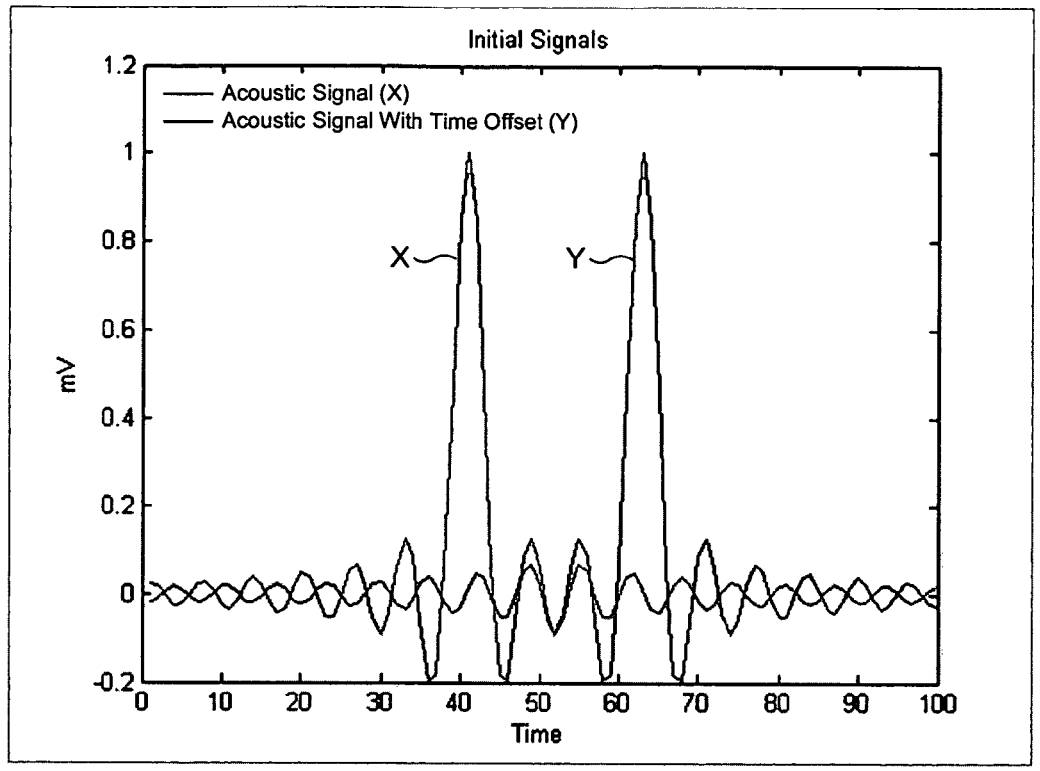
FIGS. 8*a*-8*d* illustrate offset determination and combining of two time displaced acoustic signals.
Figure 8B:
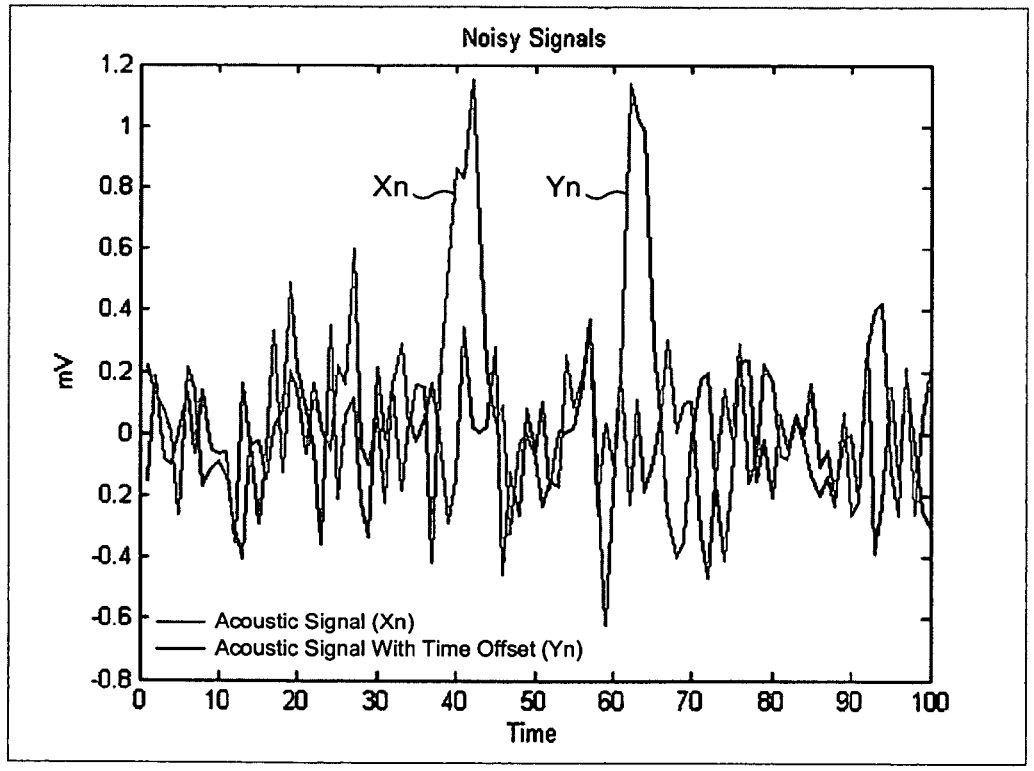
Figure 8C:
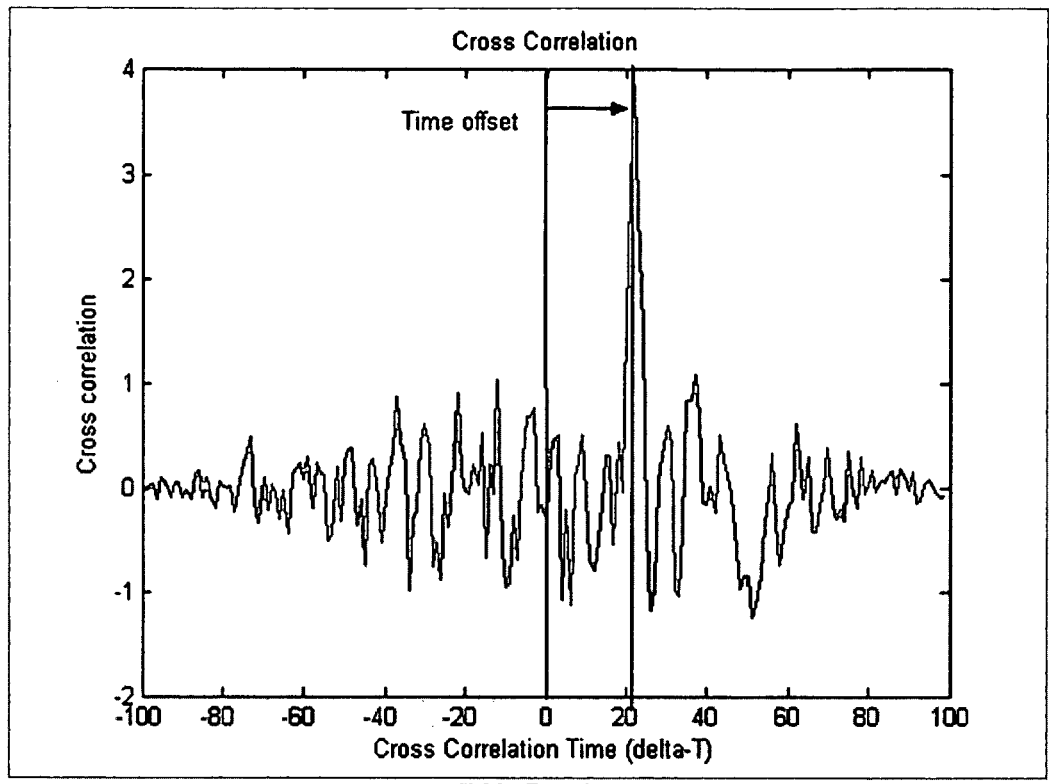

The difference in time of arrival of common acoustic features or signals can be determined using cross-correlation as will be appreciated by those skilled in the art. Alternative methods could also be used, for example pattern matching and peak matching. FIGS. 8a-8c illustrate the same acoustic signal displaced in time, by being received at two different acoustic receivers at different distances from the acoustic source. FIG. 8a illustrates the original signal (sin(x)/x) emitted by the acoustic source perfectly received at each acoustic receiver, though each received copy (X and Y) displaced in time. FIG. 8b illustrates these received signals with added white Gaussian noise (Xn and Yn). FIG. 8c illustrates the cross-correlation to determine the time offset (dT) between the two acoustic receivers. The cross-correlation yields the time offset or relative time difference (dT) to the nearest sample. More sophisticated and accurate methods can be used to extract the time offset to fractions of a sampling period. For example for voice, this is typically below 5 kHz, and so a sample period of 100 microseconds can be used.

FIGS. 9a-9d illustrate graphically one method by which the relative distances between the acoustic receivers and the acoustic source can be achieved following determination of the time of arrival difference or time offset (dT) between the various acoustic receivers.

Figure 9A:
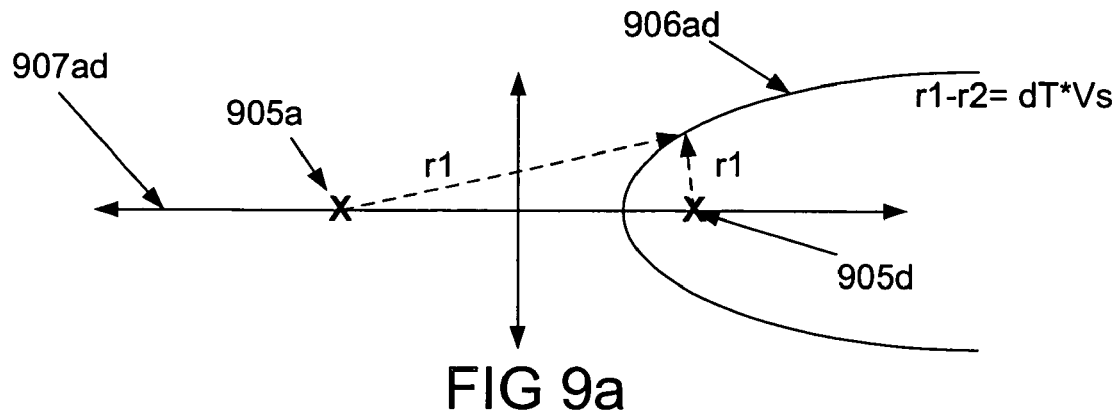
FIG. 9a illustrates graphically a hyperbola showing possible relative of an acoustic source from two acoustic receivers.

FIG. 9a illustrates a hyperbola 906ad which corresponds to possible locations for an acoustic source received by acoustic receivers 905a and 905d on a line 907ad. As will be appreciated by those skilled in the art, the hyperbola can be represented by the equation $r_a - r_d = dT * Vs$ in which the difference $(r_a - r_d)$ between any point on the hyperbola and the two acoustic receivers is always equal to the difference in the time they received the respective acoustic signal (dT) multiplied by the speed of sound (Vs). Thus a hyperbola representing possible locations of an acoustic source received by two receivers can be defined by the difference in the time at which the corresponding acoustic signal is received by each receiver (dT).

Figure 9B:
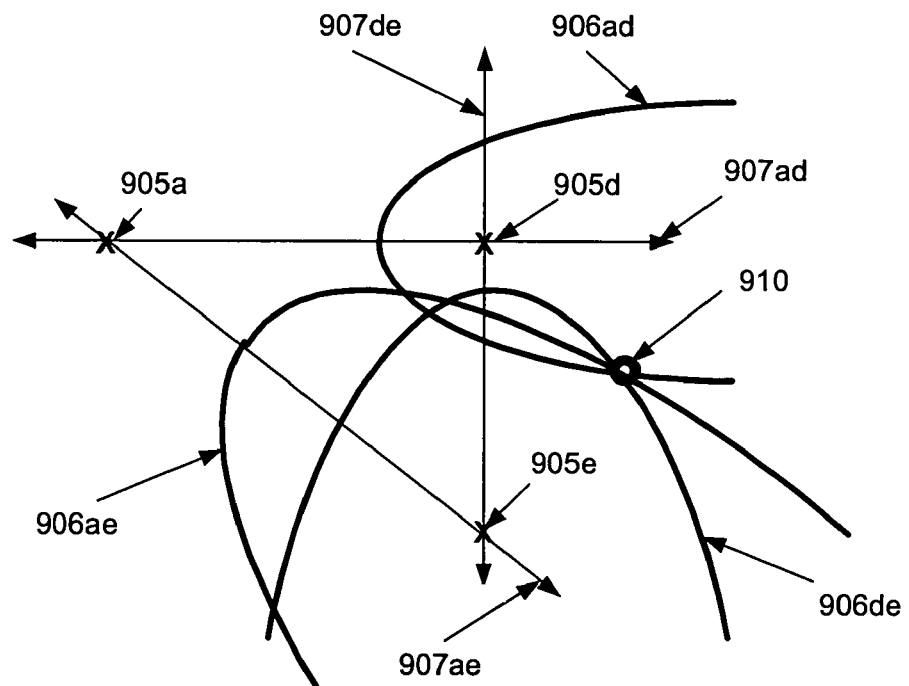
FIG. 9b illustrates the possible relative location or relative distance hyperbolas for three acoustic receivers.
Figure 9C:
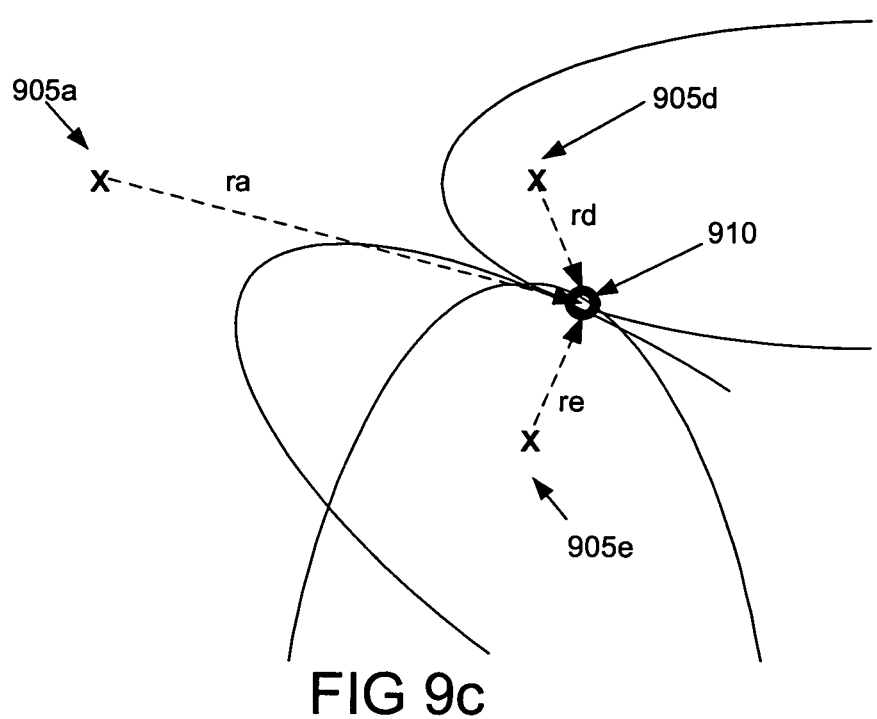
FIG. 9c illustrates determining the relative distances to each acoustic receiver using the intersection of the hyperbolas of FIG. 9b.

By defining pairs of acoustic receivers 905 in a larger system, a hyperbola corresponding to each such pair can be defined as illustrated in FIG. 9b. The hyperbola will intersect at the location of the common acoustic source 910, and at other places as shown in the figure. Thus at least three acoustic receivers are required to define a unique crossing point involving all the hyperbolas. As will be appreciated by those skilled in the art, this graphical representation will typically be implemented using simultaneous hyperbola equations and solving using standard computational techniques for any distance r to the acoustic source for each acoustic receiver as illustrated graphically in FIG. 9c.

Figure 9D:
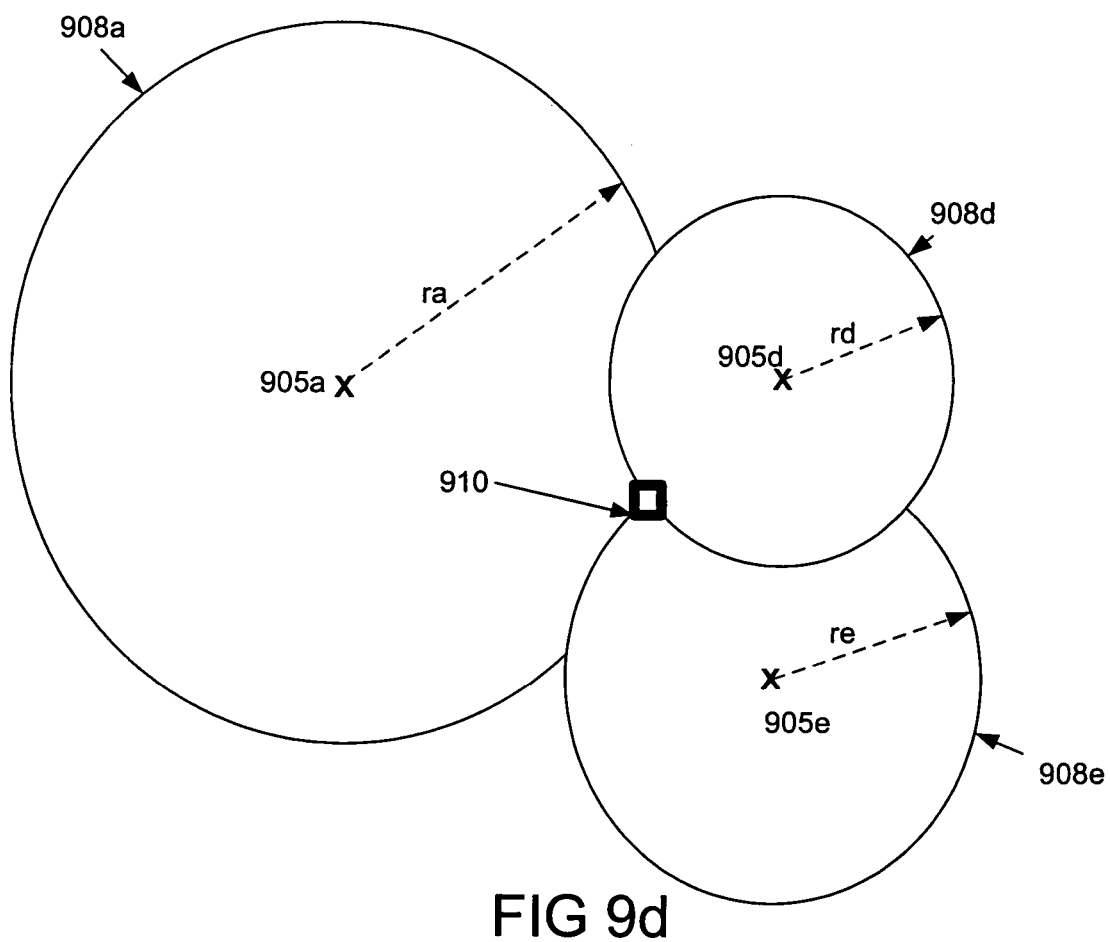
FIG. 9d illustrates graphically a method of intersecting range circles to determine the location of the acoustic source with respect to the acoustic receivers of FIG. 9c.

Once the distance or range to the source from each acoustic receiver has been determined, the location of the acoustic source relative to the acoustic receivers can be determined using for example triangulation as illustrated graphically by the intersecting circles in FIG. 9d, and as will be appreciated by those skilled in the art. Each circle represents the range between the respective acoustic receiver and the acoustic source. The location of the acoustic source 910 is the intersection of the ranges 908 of each acoustic receiver 905. Again as will be appreciated by those skilled in the art, this will typically be carried out by solving a system of equations using known computational techniques such as root finding solutions, the Newton-Raphson method, and many other methods known to mathematicians and computer scientists.

Figure 6:
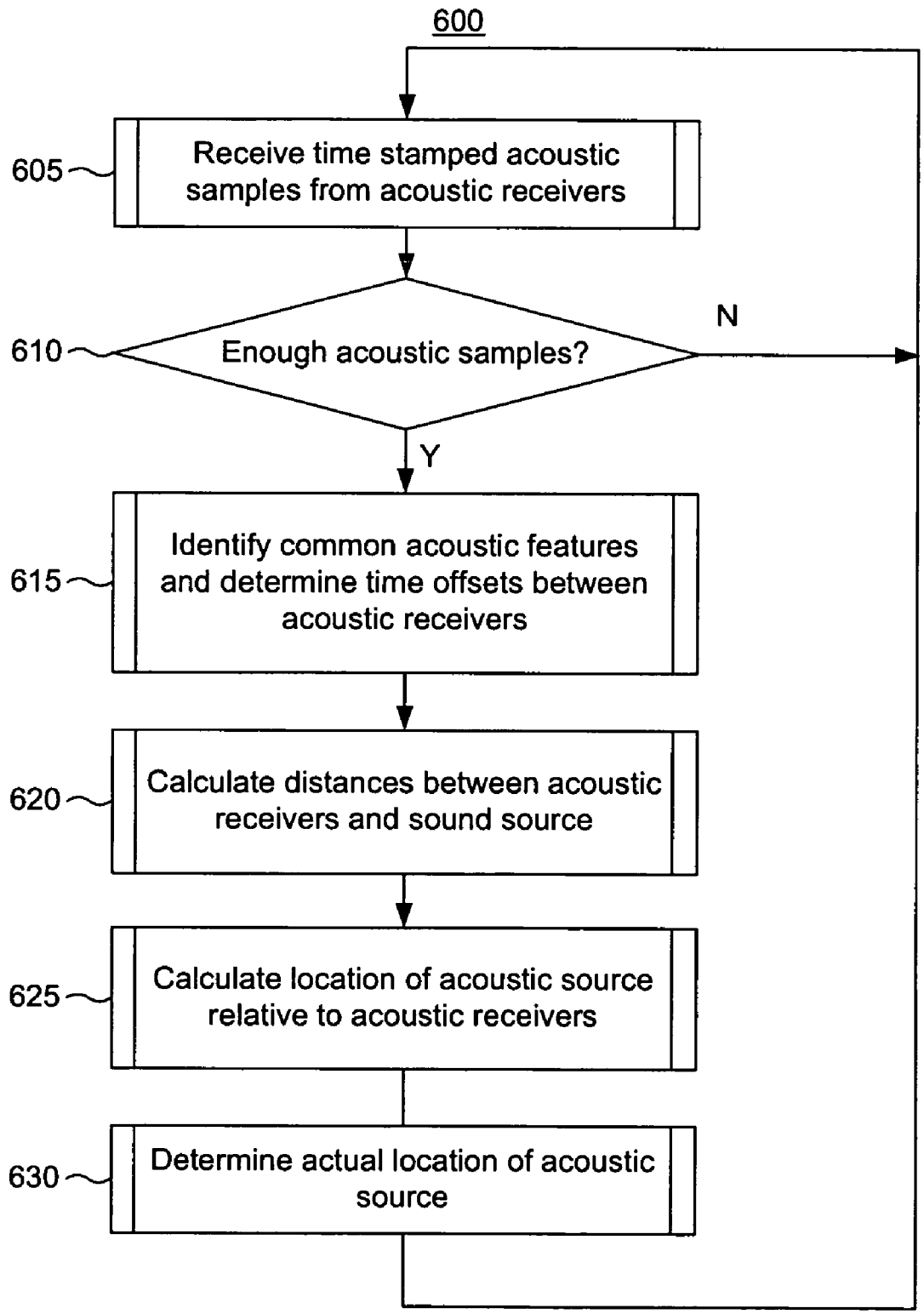
FIG. 6 illustrates a method of determining the location of an acoustic source from time-stamped samples received from a number of acoustic receivers.

Returning to the method (600) of FIG. 6, identification of common acoustic features and determining the time offsets (dT) for each pair of acoustic receivers 205 is achieved using the time stamps of the received samples from the respective receivers (615) and the cross-correlation function applied to the received samples (FIG. 8c). The distances between each acoustic receiver and the acoustic source can then be determined using the simultaneous hyperbola equations described above (620). Finally the location of the acoustic source relative to the acoustic receivers can be determined using simultaneous equations corresponding to the intersecting circles of FIG. 9d (625). Knowing the locations of the acoustic receivers, the actual location of the acoustic source can then be determined (630).

The central controller 525 may be configured to continuously receive time-stamped samples from the acoustic receivers, or it may instruct the acoustic receivers to transmit time-stamped samples within a certain period or duration of time.

The central controller can be configured to distinguish between samples from different acoustic receivers using corresponding network addresses embedded in network packet headers for example. Alternatively acoustic receiver system identifiers could be used. In a further alternative, separate communications paths could be used between each acoustic receiver and the central controller.

Figure 10:
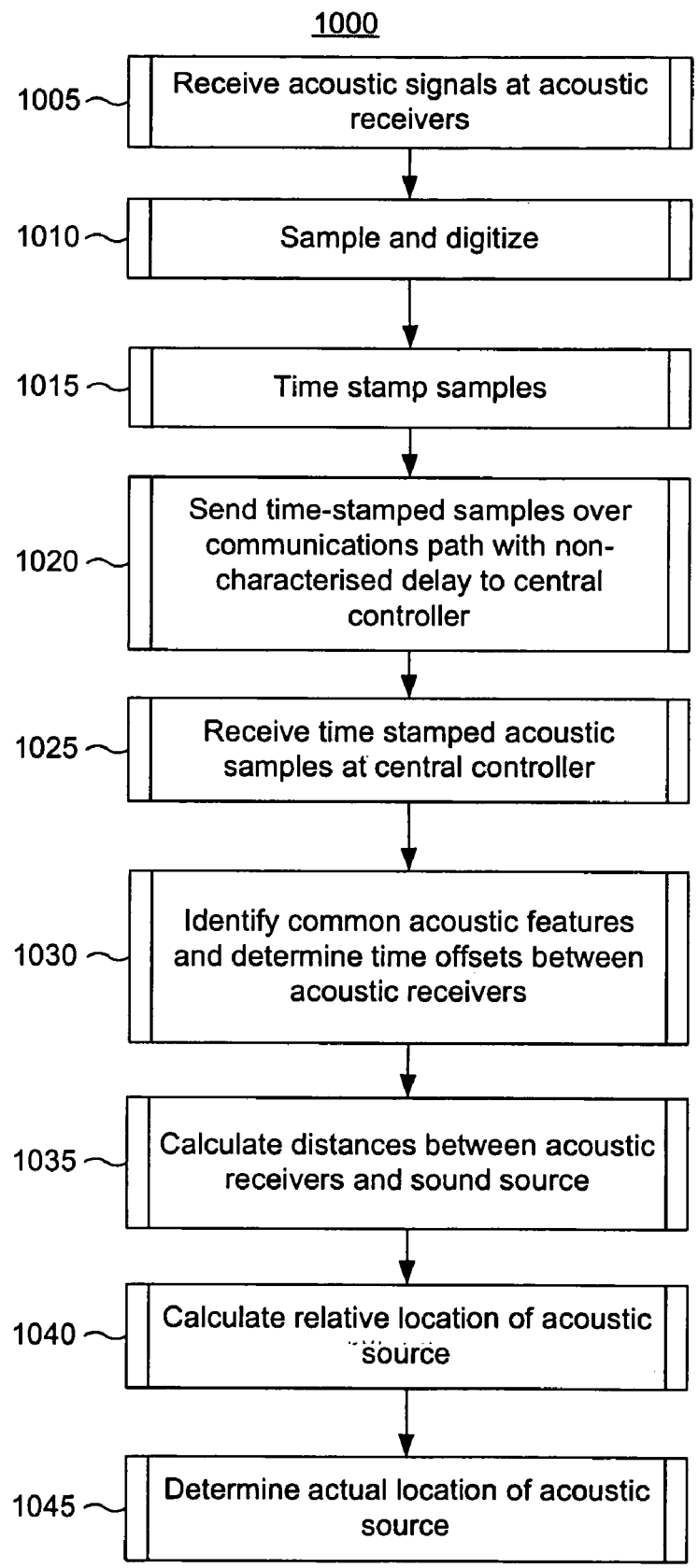
FIG. 10 illustrates a method of determining the location of an acoustic source according to an embodiment.

A method for operation of the entire system 100 of FIG. 1 is illustrated in FIG. 10. This may usefully be combined with another embodiment described below with respect to FIGS. 1 and 11 in order to locate and enhance the signal(s) received from an acoustic source. The steps of the method (1000) of FIG. 10 correspond to steps in the methods (300) and (600) of the separate acoustic receivers 205 and central controller 525 as shown respectively in FIGS. 3 and 6. Each acoustic receiver 205 receives acoustic signals from the acoustic source (1005). The received acoustic signals are sampled and the samples digitized (1010), the digitized acoustic samples then being time stamped (1015) using the system time to which all the acoustic receivers are synchronized. The time stamped samples from the various acoustic receivers 205 are then sent to the central controller 525 over the communications path having a non-characterized delay (1020). These steps correspond respectively to steps (305), (315), (320), and (325), and are explained in greater detail above with respect to FIG. 3. The sent samples are then-received at the central controller 525 (1025). The central controller identifies common acoustic features and determines time offsets between the reception times of these features at the different acoustic receivers (1030). The distances between the acoustic receivers 205 and the acoustic source can then be determined (1035). The central controller then calculates the location of the acoustic source relative to the acoustic receivers (1040), and from this the actual location of the acoustic source (1045). The central controller steps correspond respectively to steps (605), (615), (620), (625) and (630) in FIG. 6 and are explained in greater detail above with respect to this figure.

Figure 8D:
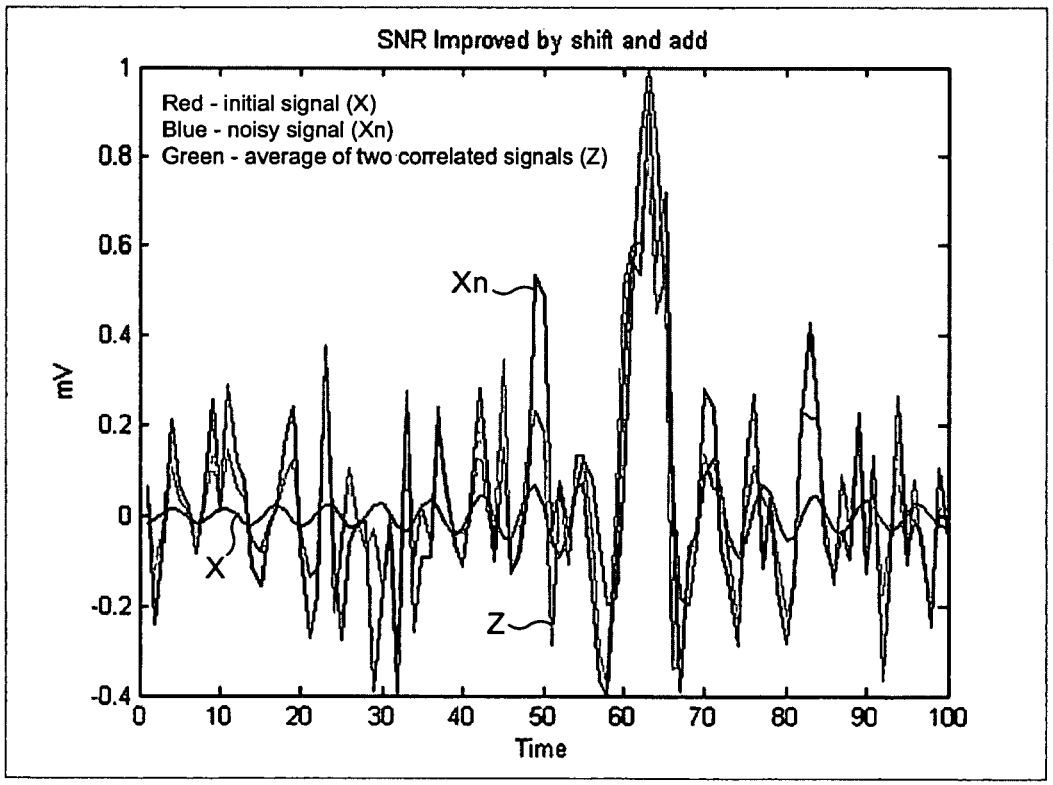

Once the location of the acoustic source has been determined, the distance from this to each acoustic receiver can be determined, and hence using the speed of sound the time delay, offset or time of arrival of an acoustic signal for each acoustic receiver. The received samples can then be re-processed to coherently add the samples together using their respective time offsets. An enhanced acoustic signal from the audio source, for example a gunshot, can then be obtained. This is illustrated by referring again to FIGS. 8*a*-8*c,* and additionally 8*d*. FIG. 8*d* shows the two waveforms of FIG. 8*b* (Xn and Yn) time aligned using the time offset obtained from the cross-correlation shown in FIG. 8*c*. The two time aligned signals have been averaged (Z), however other methods of combining could be used. It can be seen from FIG. 8*d* that the level of noise against the averaged acoustic signal (Z) has been halved compared with the combined noise of the two separate signals—as shown in FIG. 8*b*. Further averaging with signals from more than two acoustic receivers would further reduce noise and increase the signal-to-noise ratio of the enhanced signal.

A system for receiving signals from an acoustic source according to another embodiment is illustrated with respect to FIGS. 10 and 1. The array of acoustic receivers 105 are used to sample acoustic signals from the acoustic source 110 at respective acoustic receiver sampling times with respect to a common or system time. These sampling times are typically determined by the central controller 125 which instructs the acoustic receivers accordingly, using the communications path or network 120. The samples are returned to the central controller to be coherently added or combined. The respective acoustic sampling times for each acoustic receiver are dependent on the distance from the respective receiver to the acoustic source. Thus the same acoustic signal or feature is sampled at each acoustic receiver. These sampled signals can then be added together to produce an enhanced signals with greater signal power and/or lower signal to noise ratio.

Because the acoustic receivers are all synchronized to the same system time, the controller does not need to maintain a list of the relative time offsets between the receivers, and shift each respective receivers sampling time or received samples accordingly. This saves considerable processing power which can be traded against a more relaxed specification and/or cheaper processor for the central controller for example.

Figure 11:
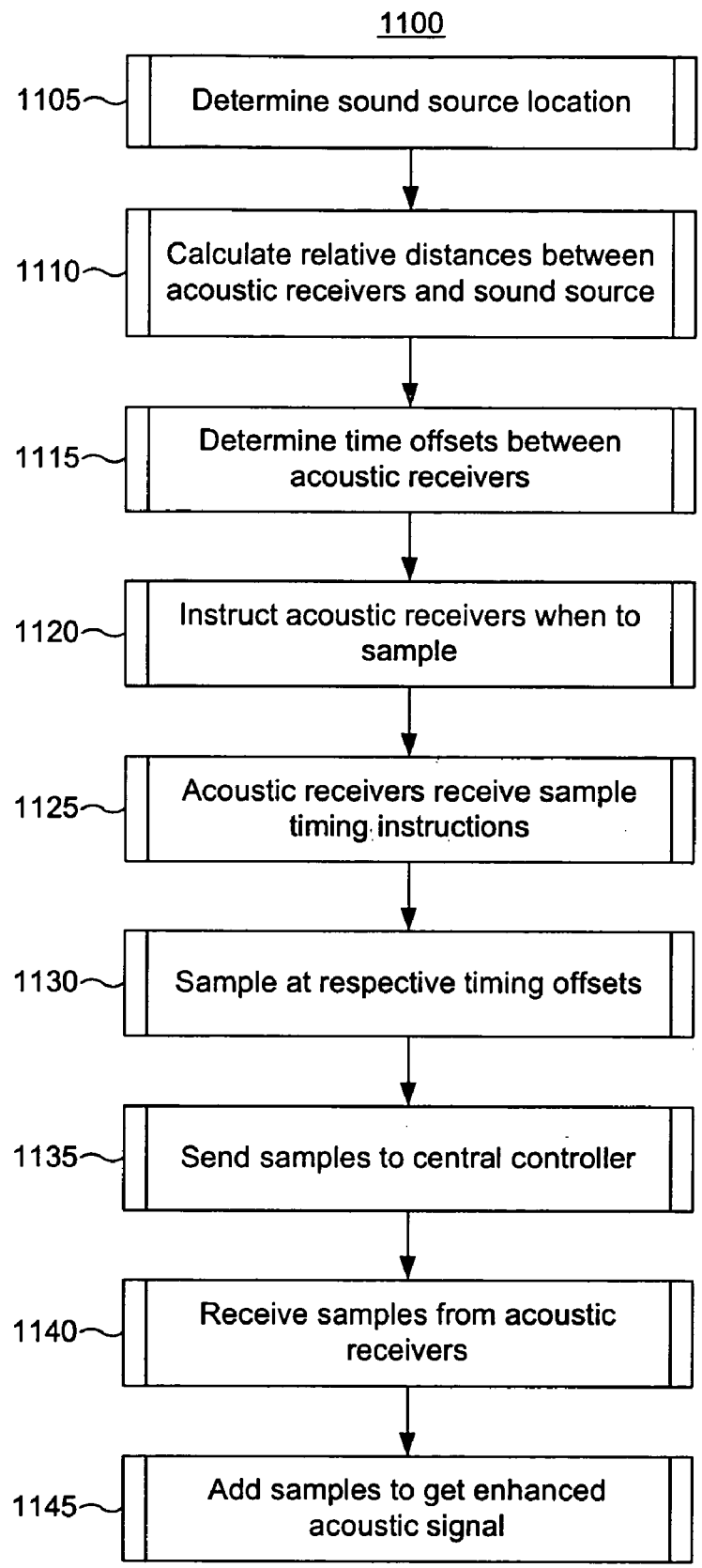
FIG. 11 illustrates a method of enhancing an acoustic signal from an acoustic source.

FIG. 11 shows a method of operating the system of FIG. 1 according to the embodiment. The method (1100) comprises determining the location of the acoustic source (1105). The location of the acoustic source can be determined according to the previous embodiment, or using some other mechanism, for example manual determination The central controller 125 then determines the relative distances between each acoustic receiver and the acoustic source (1110), the acoustic receivers having a known location. The central controller 125 then determines the respective acoustic receiver sampling times for each acoustic receiver with respect to the system time (1115). This is based on the previously determined relative distance, and the speed of sound. Acoustic signals from the acoustic source 110 can then be coherently sampled by the array of acoustic receivers 105. Because the acoustic receivers are all time synchronized, the controller does not need to perform further calculations to take account of various acoustic receiver offsets. The central controller 125 then instructs the acoustic receivers to sample at their respective receiver times (1120). This may be a one-off instruction for example to sample for a given duration starting from a particular system time, or it may be to periodically sample at a given time offset from a regular system time marker (eg every 100 microseconds). In this later case, groups or sets of samples will be produced, one from each acoustic receiver offset by its respective acoustic receiver sampling time from the groups system time markers.

The acoustic receivers 105 receive their respective acoustic receiver sampling times or offsets (1125), and sample the acoustic source signals at these offsets (1130). The offsets or respective receiver times are all determined according to a system time. This may be implemented using local clocks synchronized to a master clock in the central controller, for example using the PTP system described above. The samples from each acoustic receiver are then forwarded to the central controller 125 over the communications path or network (1135).

The communications path may be a non characterized delay communications path such as an Ethernet LAN for example, or it may alternatively be a characterized delay communications path such as an analog coaxial cable of known length. Whilst the acoustic receiver samples may be time-stamped as described above, this is not necessary as the samples will already have been taken at a known timing offset as determined and instructed by the central controller.

The central controller 125 then receives the samples from the various acoustic receivers (1140). Because these samples have been taken at timing offsets dependent on the distance between the acoustic source and the respective acoustic receiver, they will already be effectively time-aligned such that the samples are of the same acoustic phenomena or sound emitted from the acoustic source. The acoustic samples can then be combined to get an enhanced acoustic signal from the acoustic source (1145). This enhanced signal may have a greater signal power and/or a lower signal to noise ratio because the noise on each sample will be uncorrelated. Combining the samples may simply comprise adding them together, or averaging them. More sophisticated methods of combining the samples are also contemplated, for example weighting some samples more heavily than others depending on their respective signal to noise ratios for example.

The method can also be illustrated by referring again to FIGS. 7*a*-7*c,* which show the relative arrival times of an acoustic signal at three differently located acoustic receivers. By setting appropriate sampling time delays or offsets, these three "copies" of the acoustic signal can be separately sampled providing both for redundancy and/or diversity and enhanced signal reception.

Figure 12:
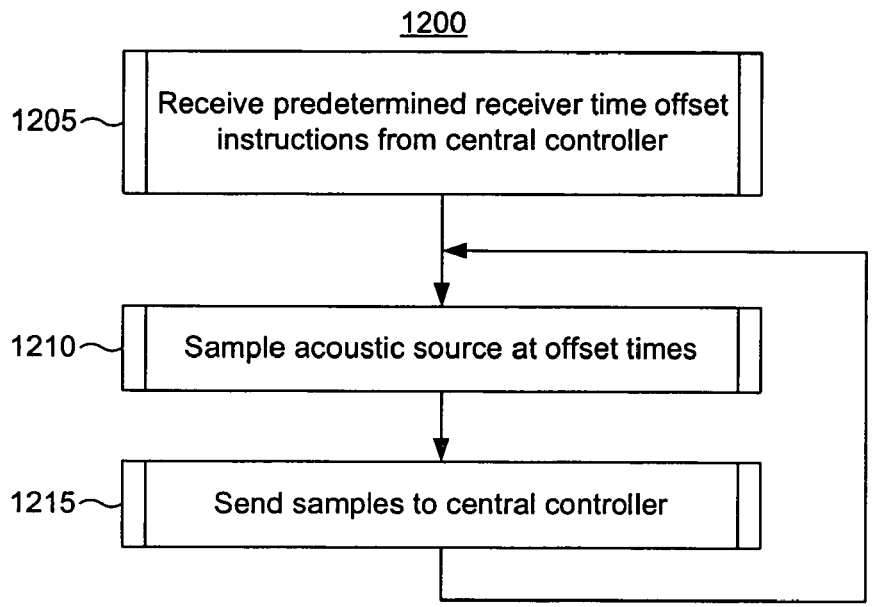
FIG. 12 illustrates a method of sampling at an acoustic receiver according to an embodiment.

The acoustic receiver 205 described with respect to FIG. 2 is suitable for use in the present embodiment. A method of operating this according to the present embodiment is illustrated in FIG. 12. Each acoustic receiver 205 receives a respective acoustic receiver sampling time or offset from the central controller (1205). This is determined according to a system time used by all of the acoustic receivers. The acoustic receiver sampling time for each respective acoustic receiver is dependent on the distance between the receiver and the acoustic source it is to sample. The respective acoustic receiver sampling time may be a single (system) time, or it may be an offset in respect of a regular (system) time marker, for example every 100 microseconds with offsets to the order of 10 microseconds, depending of course on the application and the distances involved.

Each acoustic receiver then samples the received acoustic signals at their respective acoustic receiver sampling time(s) (1210). The samples will be for a predetermined duration, for example 50 microseconds. The acoustic receiver 205 then sends the samples to the central controller over the communications path (1215). Where regular sampling takes place, the method (1200) returns to the sampling step (1210).

The samples do not need time-stamping as the time of each sample is determined in advance by the central controller. However the samples may be time-stamped in order to facilitate system operation depending on system design, for example in order to easily identify appropriate samples from respective groups of samples.

Figure 13:
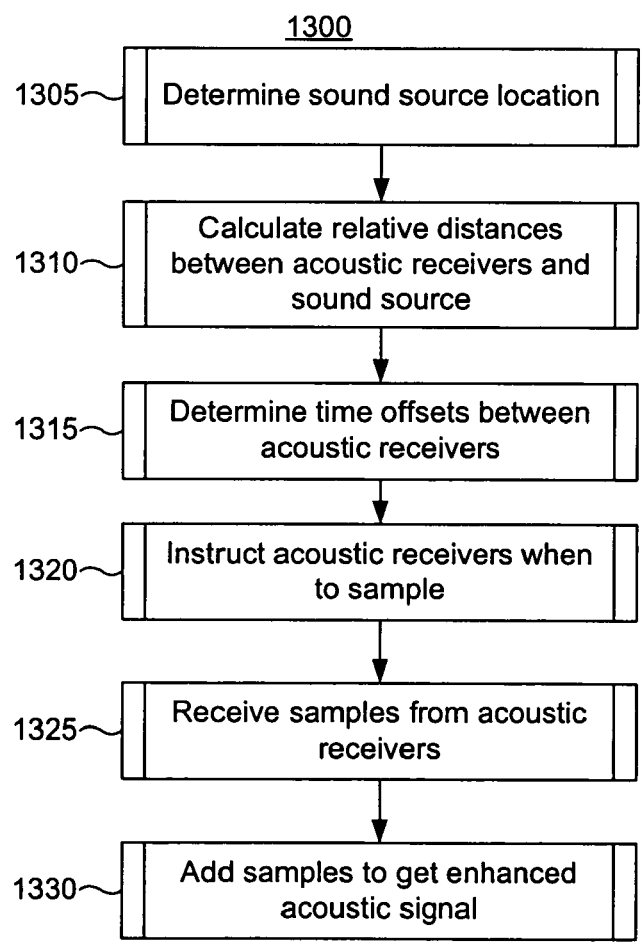
FIG. 13 illustrates a method of enhancing an acoustic signal from an acoustic source using samples received at a central controller according to an embodiment.

The central controller 525 described with respect to FIG. 5 is suitable for use in the present embodiment. A method of operating this according to the present embodiment is illustrated in FIG. 13. The method (1300) implemented by the central controller 125 determines the location of the acoustic source (1305). This may be achieved by the previously described acoustic source location embodiment. Alternatively the acoustic source location may be determined or approximated manually and entered into the central controller for example by means of a graphical user interface (GUI). For example in an application involving an auditorium where it is desired to enhance the voice of a speaker in the audience, the speaker's location may be determined by their seat location, a floor plan of the auditorium, or using the above described localization embodiment. A restricted number of speaker positions within the auditorium could alternatively be defined, for example at the end of a row of seats, from which audience members can ask questions. Detecting a human voice at one of these locations might be used to trigger a switch to a determination of that location.

Knowing the location of the acoustic receivers, for example at various locations in the auditorium, and the location of the acoustic source, the central controller method (1300) then determines the relative distances between each acoustic receiver and the acoustic source (1310). The respective acoustic receiver sampling times or offsets form a regular or periodic system time marker for each acoustic receiver are then determined (1315), using these relative distances and the speed of sound. The method (1300) then informs each acoustic receiver 205 of its respective acoustic receiver sampling time or offset (1320), for example using the network 520 and appropriately addressed packets or messages.

The respective acoustic receiver sampling times or offsets are determined using the system time, which is also used by the acoustic receivers. In an embodiment the PTP system described above is used to synchronize local clocks on the acoustic receivers with a master clock.

After sampling by the acoustic receivers, acoustic samples sampled at respective receiver times are received from the acoustic receivers by the central controller (1325). The samples, assuming they are all from the same group, can then be combined to produce an enhanced acoustic signal (1330). The same group or set refers to the same acoustic feature or group of respective acoustic receiver sampling times or offsets. In some embodiments, the acoustics receivers may repeatedly sample the acoustic source at respective offset times compared with a system marker time, and each group of samples refers to the system marker time.

In an alternative embodiment, the central controller 525 may use the determined respective acoustic receiver sampling times to select certain time-stamped samples received from the acoustic receivers for combining. In this embodiment the acoustic receivers aren't instructed to sample at specific sampling times or offsets but instead continuously sample and time-stamp the samples. These time-stamped samples are sent to the central controller which selects only those time-stamped samples which correspond to the previously determined respective acoustic receiver sampling time or offset for each receiver. Suitably selected samples from different acoustic receivers can then be coherently combined; for example one from each group of sampling times associated with a system time marker as described above. This embodiment doesn't require any additional functionality in the acoustic receivers compared with those used for the acoustic source location embodiment described previously. However additional processing capacity may be required in the central controller compared with the above described embodiment.

Figure 14:
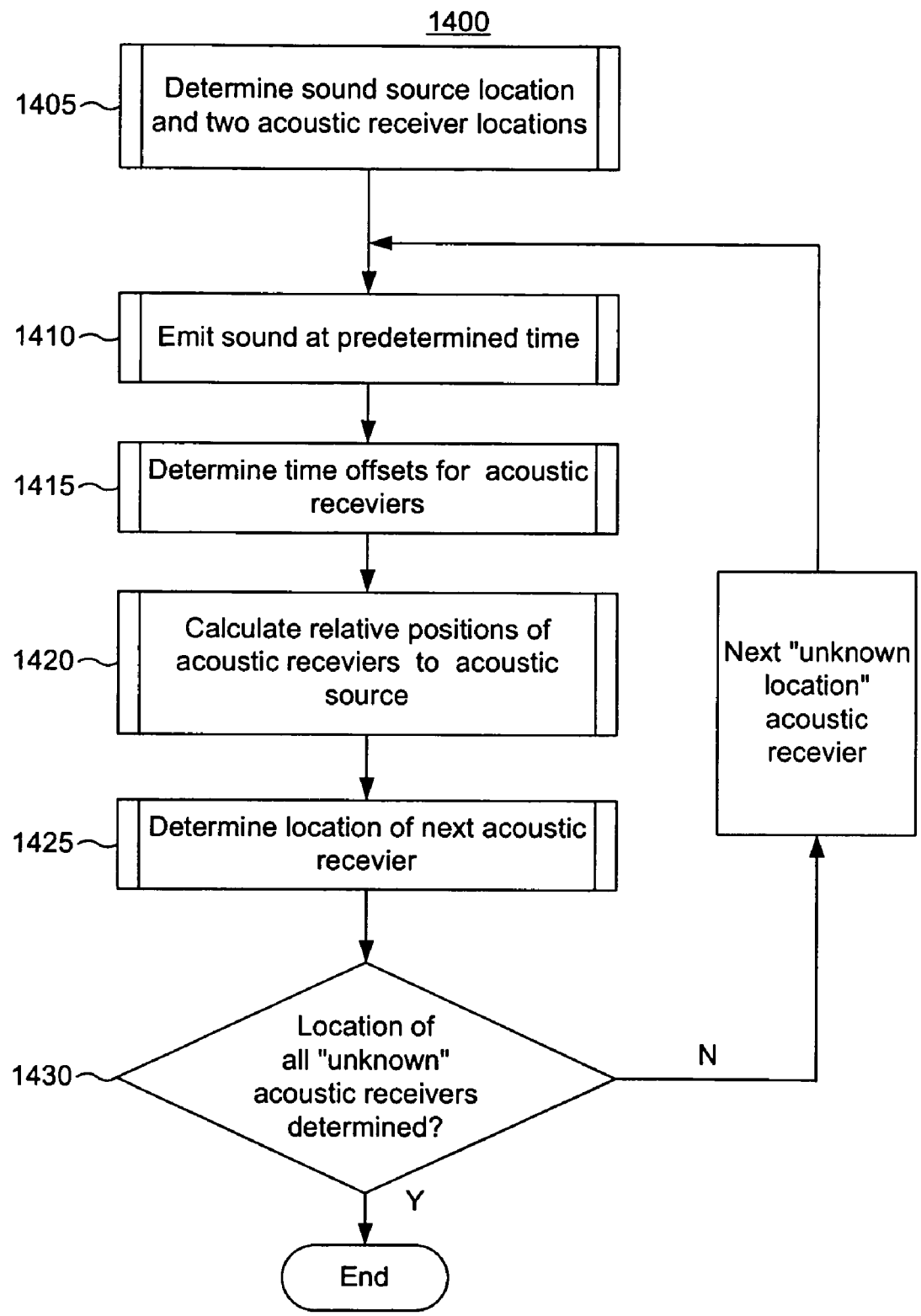
FIG. 14 illustrates a method of determining locations of acoustic receivers according to an embodiment.

FIG. 14 illustrates another embodiment, in which the locations of acoustic receivers are determined based on a known location and a known acoustic emission time for an acoustic source, and known locations of at least two of the acoustic receivers. For finding a new acoustic receiver locations, two known acoustic receiver locations (X1, Y1) and (X2, Y2) are required. Knowing the time of the acoustic source emission (Te) gives the radius (R3) or distance from a known acoustic receiver or microphone to the sound source by determining the time of receipt (T3) of the emission at the receiver–$R1=(Te-T3)/Vs$, where $Vs$=velocity of sound. This can be used to provide the relative positions (X3, Y3) of the (next) unknown location acoustic receiver relative to the first two known location acoustic receivers. Various mathematical methods will be available to those skilled in the art to determine this location, for example the intersecting hyperbola (FIGS. 9a-9c) and intersecting circle (FIG. 9d) simultaneous equations described above. Also since any 3 points determine a plane, all subsequent acoustic receivers can be found with X coordinates within the above plane, and where the Y points are the heights (or depths) relative to the plane through the first three points; the initial two known acoustic receiver locations and the first determined one after that.

Referring in more detail to the method of FIG. 14, the sound source and two or more acoustic receiver locations can be determined manually for example (1405). The sound source emits a predetermined sound or waveform at a predetermined time (1410). The relative distances between the "to be determined" or unknown location acoustic receiver and the two known location acoustic receivers can then be determined using the relative time offsets between receiving the sounds (1415). This can be achieved using the cross-correlation method described above with respect to FIG. 8 and the hyperbola equations method described above with respect to FIG. 9. Thus the relative distances between the three acoustic receivers and the sound source can be determined (1420). These ranges can then be used to locate the third acoustic receiver using the intersecting circles method illustrated in FIG. 9d (1425), with the actual location of the sound source and two of the acoustic receivers being known. The method is then repeated for each of the unknown location acoustic receivers (1430N).

Figure 15:
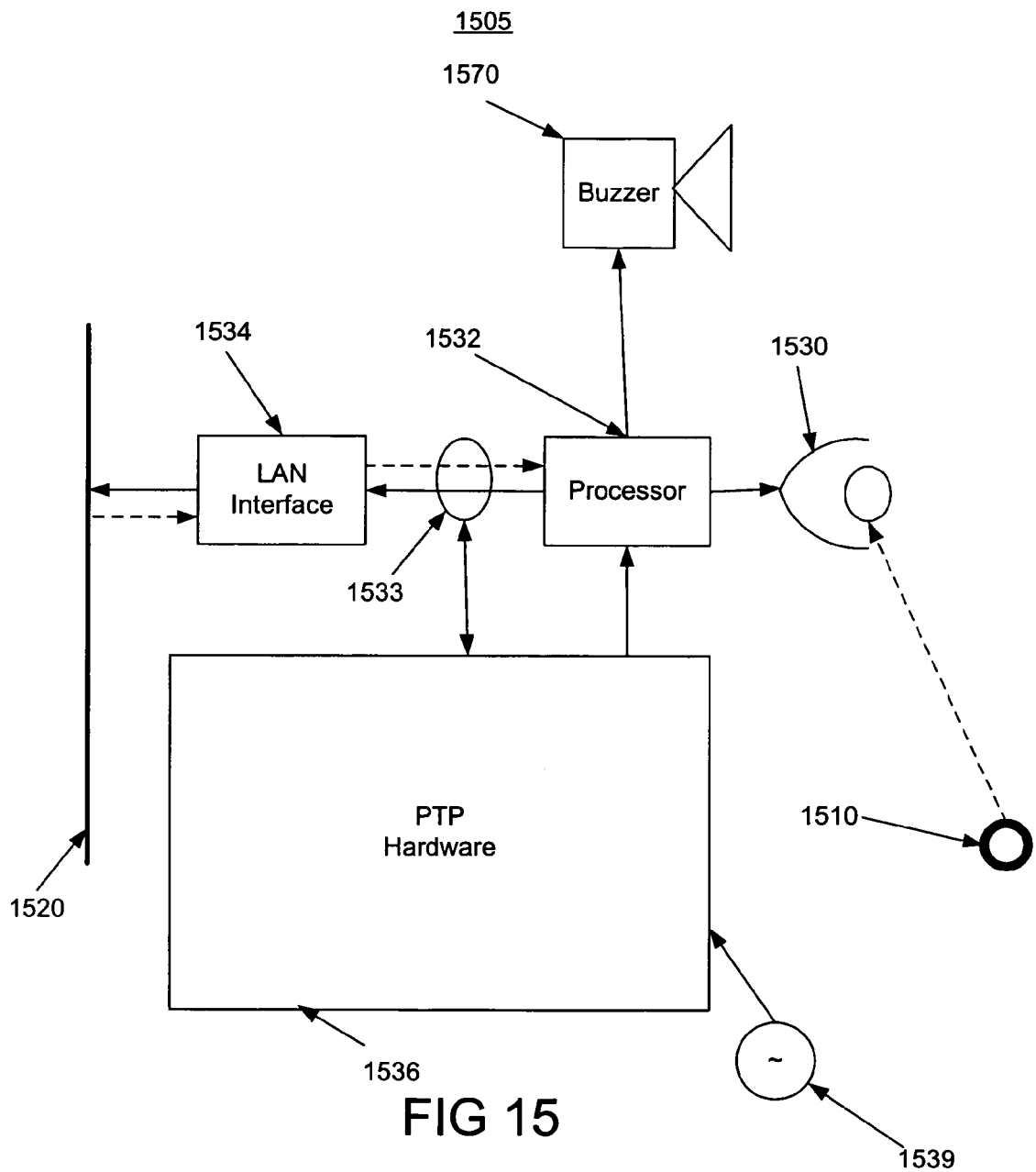
FIG. 15 illustrates an acoustic receiver according to an embodiment.

This method can be used to calibrate the system 100 of FIG. 1, before use in the localization embodiment of FIG. 10 and/or the acoustic signal enhancement method of FIG. 11. The sound source can be one of the known location acoustic receivers, using a suitable sound source such as a buzzer or speaker as illustrated in FIG. 15. This figure shows an acoustic receiver as already shown in FIG. 2 and with analogous components, but with the addition of a buzzer 1570.

The localization embodiment of FIG. 10 and/or the acoustic signal enhancement embodiment of FIG. 11 can be used for various applications. For example, they can be used for locating and enhancing the sound of a gunshot within the vicinity of an acoustic receiver array. In another example, the acoustic receiver array may be employed in an auditorium in order to locate a speaker and enhance their voice for reproduction over a speaker system for example. The embodiments may be used in security applications, for example to locate the position of footfalls or other sounds indicating unauthorized movement or presence. The system may also be used to amplify voices in the vicinity of a microphone array, for example for surveillance purposes.

The skilled person will recognize that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognize that various alterations and modifications can be made to specific examples described without departing from the scope of the appended claims.

The invention claimed is:

1. A method comprising:
    sampling an acoustic source at a plurality of acoustic receivers;
    each acoustic receiver time-stamping a respective received acoustic sample using a system time;
    each acoustic receiver sending said time-stamped acoustic sample to a central controller;
    the central controller coherently combining the received acoustic samples according to their respective time stamps and the location of the acoustic source in order to generate an enhanced acoustic source signal.

2. A method as claimed in claim 1, wherein each acoustic receiver is synchronized to the system time using a Precision Time Protocol.

3. A method as claimed in claim 1, wherein the time-stamped acoustic samples are sent over a communications path having a non-characterized delay.

4. A method as claimed in claim 1, wherein sampling the acoustic source is in response to detecting a predetermined acoustic pattern.

5. A method as claimed in claim 1, further comprising:
    the central controller determining the location of the acoustic source in response to receiving the time-stamped acoustic samples from the plurality of receivers, by:
    determining acoustic signal time of arrival differences between the acoustic receivers;
    calculating the relative distance from the acoustic source to each acoustic receiver based on said time of arrival differences;
    determining the location of the acoustic source using said relative distances.

6. A method as claimed in claim 1, further comprising:
    at each of a plurality of acoustic receivers, synchronizing a local clock to an external system time;
    sampling said acoustic source at each of the acoustic receivers, at respective acoustic receiver sampling times, and in response to receiving corresponding instructions from a central controller at each of the acoustic receivers; p1 each acoustic receiver sending said acoustic samples to the central controller; and
    at the central controller, and in response to knowledge of the acoustic receiver sampling times and the received acoustic samples, combining the received acoustic samples in order to generate an enhanced acoustic source signal.

7. A carrier medium carrying a computer program which when executed on a computer is arranged to carry out the method of claim 1.

8. A method of receiving samples from an acoustic source, the method comprising:
    sampling said acoustic source at a plurality of acoustic receivers having different locations and at respective acoustic receiver sampling times, said acoustic receivers having been synchronized to a common system time;
    each acoustic receiver sending said acoustic sample to a central controller;
    the central controller coherently combining the acoustic samples received from the plurality of acoustic receivers.

9. A method as claimed in claim 8, wherein the respective acoustic receiver sampling times are dependent on the distance from the acoustic source to the respective acoustic receiver.

10. A method as claimed in claim 8, wherein the acoustic receivers are synchronized to the system time using a Precision Time Protocol.

11. A method as claimed in claim 8, wherein combining the acoustic samples comprises coherently averaging said samples.

12. A method as claimed in claim 8, wherein the acoustic samples are sent over a digital communications path having a non-characterized delay.

13. A carrier medium carrying a computer program which when executed on a computer is arranged to carry out the method of claim 8.

14. An acoustic receiver comprising:
    an acoustic transducer for transducing acoustic signals received from an acoustic source;
    a local clock synchronized to an external system time;

a communications interface arranged to interface with a communications path having a non-characterized delay; and a processor arranged to sample the received acoustic signals from the acoustic source at a respective acoustic receiver sampling time in response to receiving corresponding instructions, and to transmit said samples onto the communications path having the non-characterized delay.

15. An acoustic receiver as claimed in claim 14, wherein the local clock is synchronized to the external system time using a Precision Time Protocol.

16. A method of locating an acoustic source, the method comprising:

at each of a plurality of acoustic receivers, synchronizing a local clock to an external system time;

sampling the acoustic source at each of the acoustic receivers, at respective acoustic receiver sampling times, and in response to receiving corresponding instructions from a central controller at each of the acoustic receivers;

sending said acoustic samples from each of the acoustic receivers to the central controller; and determining, at the central controller, and in response to knowledge of the acoustic receiver sampling times and the received acoustic samples, a location of the acoustic source.

17. A method as claimed in claim 16, further comprising:

the central controller determining the relative distances between each acoustic receiver and the acoustic source based on the determined acoustic source location;

calculating the respective receiver times dependent on the distance from the acoustic source to the respective acoustic receiver; and sending the respective acoustic receiver times to the respective acoustic receivers.

* * * * *

UNITED STATES PATENT AND TRADEMARK OFFICE
CERTIFICATE OF CORRECTION

PATENT NO. : 7,558,156 B2
APPLICATION NO. : 11/326342
DATED : July 7, 2009
INVENTOR(S) : Vook et al.

It is certified that error appears in the above-identified patent and that said Letters Patent is hereby corrected as shown below:

In column 20, line 18, in Claim 6, after "A method" delete "as claimed in claim 1, further".

In column 20, line 26, in Claim 6, after "receivers;" delete "p1".

In column 20, lines 18–32, in Claim 6, delete
"A method as claimed in claim 1, further comprising:
at each of a plurality of acoustic receivers, synchronizing a local clock to an external system time; sampling said acoustic source at each of the acoustic receivers, at respective acoustic receiver sampling times, and in response to receiving corresponding instructions from a central controller at each of the acoustic receivers; p1 each acoustic receiver sending said acoustic samples to the central controller; and
at the central controller, and in response to knowledge of the acoustic receiver sampling times and the received acoustic samples, combining the received acoustic samples in order to generate an enhanced acoustic source signal."
and insert -- A method comprising:
at each of a plurality of acoustic receivers, synchronizing a local clock to an external system time;
sampling said acoustic source at each of the acoustic receivers, at respective acoustic receiver sampling times, and in response to receiving corresponding instructions from a central controller at each of the acoustic receivers;
each acoustic receiver sending said acoustic samples to the central controller; and
at the central controller, and in response to knowledge of the acoustic receiver sampling times and the received acoustic samples, combining the received acoustic samples in order to generate an enhanced acoustic source signal. --, therefor.

Signed and Sealed this

Eighteenth Day of August, 2009

David J. Kappos
*Director of the United States Patent and Trademark Office*